(12) United States Patent
Li et al.

(10) Patent No.: US 11,758,048 B2
(45) Date of Patent: *Sep. 12, 2023

(54) PERFORMANCE METRIC RECOMMENDATIONS FOR HANDLING MULTI-PARTY ELECTRONIC COMMUNICATIONS

(71) Applicant: Optum, Inc., Minnetonka, MN (US)

(72) Inventors: Jun Li, Minnetonka, MN (US); Julie Zhu, Maple Grove, MN (US)

(73) Assignee: Optum, Inc., Minnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,673

(22) Filed: Apr. 11, 2022

(65) Prior Publication Data

US 2022/0239776 A1  Jul. 28, 2022

Related U.S. Application Data

(63) Continuation of application No. 17/161,046, filed on Jan. 28, 2021, now Pat. No. 11,330,105.

(60) Provisional application No. 63/038,285, filed on Jun. 12, 2020.

(51) Int. Cl.
| | | |
|---|---|---|
| *H04M 3/51* | (2006.01) | |
| *G06F 40/30* | (2020.01) | |
| *G06N 20/00* | (2019.01) | |
| *G06Q 10/06* | (2023.01) | |
| *H04M 3/22* | (2006.01) | |
| *H04M 3/523* | (2006.01) | |
| *G06Q 10/0639* | (2023.01) | |

(52) U.S. Cl.
CPC .......... *H04M 3/5175* (2013.01); *G06F 40/30* (2020.01); *G06N 20/00* (2019.01); *G06Q 10/06398* (2013.01); *H04M 3/2218* (2013.01); *H04M 3/5233* (2013.01)

(58) Field of Classification Search
CPC ............. H04M 3/5175; H04M 3/2218; H04M 3/5233; G06F 40/30; G06N 20/00; G06Q 10/06398
USPC ............ 379/265.06, 265.05, 265.07, 265.08, 379/265.11, 265.09, 265.13, 265.01, 379/265.12
See application file for complete search history.

(56) References Cited

U.S. PATENT DOCUMENTS

| | | |
|---|---|---|
| 7,606,714 B2 | 10/2009 | Williams et al. |
| 10,601,992 B2 | 3/2020 | Dwyer et al. |
| 10,783,798 B2 | 9/2020 | Flaherty et al. |
| 10,805,465 B1 | 10/2020 | Krebs et al. |
| 10,839,335 B2 | 11/2020 | Weisman et al. |

(Continued)

OTHER PUBLICATIONS

U.S. Appl. No. 17/161,046, filed Jan. 28, 2021, U.S. Pat. No. 11,330,105, Issued.

(Continued)

*Primary Examiner* — Thjuan K Addy
(74) *Attorney, Agent, or Firm* — Alston & Bird LLP

(57) ABSTRACT

Provided herein are methods, systems, computing devices, and/or computing entities for generating a performance metric recommendation by generating an agent group data object for an agent profile; generating an agent assessment data object for the agent profile; generating an inferred performance gap data object for the agent profile; and generating the performance metric recommendation based at least in part on the inferred performance gap data object.

20 Claims, 8 Drawing Sheets

(56) References Cited

U.S. PATENT DOCUMENTS

| | | |
|---|---|---|
| 11,330,105 B2 | 5/2022 | Li et al. |
| 2012/0130771 A1 | 5/2012 | Kannan et al. |
| 2014/0270133 A1 | 9/2014 | Conway et al. |
| 2015/0003595 A1 | 1/2015 | Yaghi et al. |
| 2015/0201077 A1 | 7/2015 | Konig et al. |
| 2015/0379562 A1* | 12/2015 | Spievak ............ G06Q 10/0639 379/265.09 |
| 2017/0270822 A1 | 9/2017 | Cohen |
| 2020/0111377 A1 | 4/2020 | Truong et al. |

OTHER PUBLICATIONS

"Using Machine Learning to Enhance Customer Satisfaction," DecisivEdge, (6 pages). [Article, Online]. [Retrieved from the Internet Feb. 17, 2021] <URL: http://web.archive.org/web/20200922052612/https://www.decisivedge.com/blog/using-machine-learning-to-enhance-customer-satisfaction/>.

Sawers, Paul. "Observe.ai Raises $26 Million for AI That Monitors and Coaches Call Center Agents," VentureBeat, Dec. 10, 2019, (9 pages). [Article, Online]. [Retrieved from the Internet Feb. 17, 2021] <URL: https://venturebeat.com/2019/12/10/observe-ai-raises-26-million-for-ai-that-monitors-and-coaches-call-center-agents/>.

* cited by examiner

PERFORMANCE METRIC RECOMMENDATIONS FOR HANDLING MULTI-PARTY ELECTRONIC COMMUNICATIONS

CROSS-REFERENCE TO RELATED APPLICATIONS

This application is a continuation of U.S. application Ser. No. 17/161,046 filed Jan. 28, 2021, which claims priority U.S. Appl. Ser. No. 63/038,285 filed Jun. 12, 2020, which is incorporated herein by reference in their entireties, including any appendices, figures, tables, and drawings.

TECHNOLOGICAL FIELD

Embodiments of the present disclosure generally relate to a technology framework for intelligently handling multi-party electronic communications (e.g., electronic communications involving two or more parties, such as voice-based communications involving two or more parties and/or text-based communications involving two or more parties).

BACKGROUND

A need exists in the industry to address technical challenges related to intelligently handling multi-party electronic communications (e.g., electronic communications involving two or more parties, such as voice-based communications involving two or more parties and/or text-based communications involving two or more parties). Another need exists in the industry to address technical challenges related to intelligently identifying training recommendations for a contact center agent that are personalized based on the agent's performance with respect to a performance of a top performing agent.

BRIEF SUMMARY

In general, embodiments of the present disclosure provide methods, apparatus, systems, computing devices, computing entities, and/or the like for processing one or more performance metric recommendations for an agent profile. In accordance with one aspect of the disclosure, a method is provided. In various embodiments, the method comprises generating, via one or more processors, an agent feature data object for the agent profile representing an agent based at least in part on a plurality of communication data objects representing a plurality of communications associated with the agent profile; generating, via the one or more processors, an agent group data object for the agent profile based at least in part on the agent feature data object and an agent group identifier machine learning model; identifying, via the one or more processors, a top agent performer data object based at least in part on the agent group data object generated for the agent profile; generating, via the one or more processors, an agent assessment data object for the agent profile, wherein the agent assessment data object represents a performance evaluation for the agent represented by the agent profile in relation to one or more of the plurality of communications; generating, via the one or more processors, one or more inferred performance gap data objects based at least in part on the agent assessment data object, the top agent performer data object, and a comparison machine learning model; generating, via the one or more processors, one or more performance metric recommendations based at least in part on the one or more inferred performance gap data objects; and initiating, via the one or more processors, one or more performance-related actions based at least in part on the one or more performance metric recommendations.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least generate an agent feature data object for the agent profile representing an agent based at least in part on a plurality of communication data objects representing a plurality of communications associated with the agent profile; generate an agent group data object for the agent profile based at least in part on the agent feature data object and an agent group identifier machine learning model; identify a top agent performer data object based at least in part on the agent group data object generated for the agent profile; generate an agent assessment data object for the agent profile, wherein the agent assessment data object represents a performance evaluation for the agent represented by the agent profile in relation to one or more of the plurality of communications; generate one or more inferred performance gap data objects based at least in part on the agent assessment data object, the top agent performer data object, and a comparison machine learning model; generate one or more performance metric recommendations based at least in part on the one or more inferred performance gap data objects; and initiate one or more performance-related actions based at least in part on the one or more performance metric recommendations.

In accordance with yet another aspect of the present disclosure, a computer program product is provided. In particular embodiments, the computer program product includes a non-transitory computer storage medium having instructions stored therein. The instructions being configured to cause one or more computer processors to at least perform operations configured to: generate an agent feature data object for the agent profile representing an agent based at least in part on a plurality of communication data objects representing a plurality of communications associated with the agent profile; generate an agent group data object for the agent profile based at least in part on the agent feature data object and an agent group identifier machine learning model; identify a top agent performer data object based at least in part on the agent group data object generated for the agent profile; generate an agent assessment data object for the agent profile, wherein the agent assessment data object represents a performance evaluation for the agent represented by the agent profile in relation to one or more of the plurality of communications; generate one or more inferred performance gap data objects based at least in part on the agent assessment data object, the top agent performer data object, and a comparison machine learning model; generate one or more performance metric recommendations based at least in part on the one or more inferred performance gap data objects; and initiate one or more performance-related actions based at least in part on the one or more performance metric recommendations.

In particular embodiments, the agent feature data object for an agent profile representing an agent may be generated by generating one or more text transcripts from a plurality of communication data objects and processing the one or more text transcripts using a transcription processing machine learning model to generate a transcription-based embedding data object for the agent feature data object. For instance, in some embodiments, the transcription processing machine learning model may comprise a bidirectional encoder representations from transformers natural language processing machine learning model. In addition, in particular embodiments, the agent feature data object for an agent profile representing an agent may be generated by processing one or more behavioral detection data objects associated with the agent profile using an behavioral processing machine learning model to generate a behavioral-based embedding data object, wherein the one or more behavioral detection data objects identify behavioral attributes recorded in relation to an observed behavior of the agent represented by the agent profile during the plurality of communications, and processing the transcription-based embedding data object and the behavioral-based embedding data object using an agent feature merger machine learning model to generate the agent feature data object.

Further, in particular embodiments, a party feature data object may be generated for a party profile representing a party. In these particular embodiments, the party feature data object may be processed using a talking point identifier machine learning model to generate a plurality of recommended talking point data objects for the party profile. Accordingly, in some embodiments, the party feature data object may be generated by generating one or more text transcripts from a plurality of communication data objects associated with the party profile and processing the one or more text transcripts using the transcription processing machine learning model to generate a transcription-based embedding data object of the party feature data object. In addition, in some embodiments, the party feature data object may be generated by processing one or more party feature data objects associated with the party profile using a party feature processing machine learning model to generate a party-based embedding data object and processing the transcription-based embedding data object for the party profile and the party-based embedding data object using a party feature merger machine learning model to generate the party feature data object. Further, in some embodiments, the one or more performance-related actions may comprise causing presentation of a personalized simulation training characterized by a simulated communication data object between the agent represented by the agent profile and the party represented by the party profile, and wherein the simulated communication data object is determined based at least in part on the plurality of recommended talking point data objects.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1:
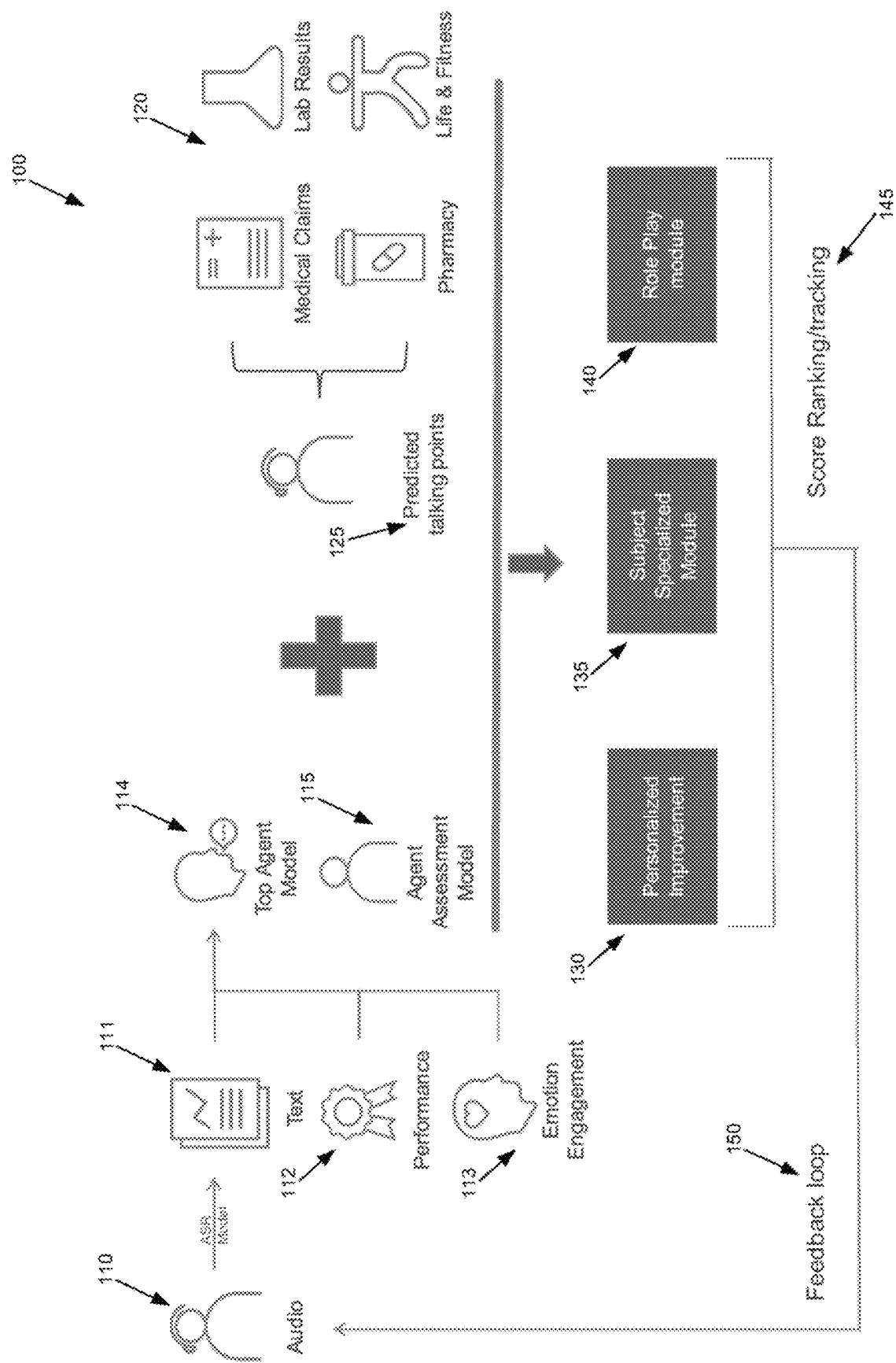
FIG. 1 is an intelligent training technology framework in accordance with various embodiments of the present disclosure.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "agent profile" may refer to a data object that identifies an agent tasked with handling one or more multi-party communications. In various embodiments, an agent is an individual tasked with handling inbound and/or outbound communications in a contact center environment. The agent profile may serve as a data representation of the agent and may provide an identification of the agent, as well as other features associated with the agent.

The term "party profile" may refer to a data object that identifies a party who may be or may have been engaged in a communication with an agent. Specifically, a party may be an individual who has placed an inbound communication or received an outbound communication from a content center. The party typically is engaged in the communication with an agent for a specific purpose such as, for example, the party may be checking on the status of an ordered placed for a product or seeking technical support on an issue the party is experiencing with a product. Similar to the agent profile, the party profile may serve as a data representation of the party and may provide an identification of the party, as well as other features associated with the party.

The term "communication data object" may refer to a data object that identifies a communication being conducted between two or more parties such as, for example, an agent and a party. Accordingly, the communication may be conducted using various channels of communication such as voice call, video call, chat, text message exchange, email exchange, etc.

The term "transcription-based embedding data object" may refer to a data object representing one or more features inferred from the words spoken by an agent and/or party engaged in one or more communications involving the agent and/or party. In various embodiments, the transcription-based embedding data object is configured as a vector of feature values representing various features identified from the words spoken by the agent and/or party while engaged in the one or more communications. Accordingly, in various embodiments, the transcription-based embedding data object serves in a functional role to represent the relevant semantic features of the communication(s) that can be used, for example, for classifying an agent into an appropriate agent group, as well as for generating talking points for a party.

The term "transcription processing machine learning model" may refer to a data object that describes parameters and/or hyper-parameters (e.g., defined operations) of a model configured for processing text transcript(s) generated for one or more communications involving an agent and/or party to generate a transcription-based embedding data object for the agent and/or party. For example, in particular embodiments, the transcription processing machine learning model may be configured for performing natural language processing on the text transcript(s) generated from the audio of one or more communications that are voice calls to generate the transcription-based embedding data object. Accordingly, in some embodiments, the transcription processing machine learning model may be configured as a supervised or an unsupervised machine learning model. For example, in one embodiment, the transcription processing machine learning model may be configured as a deep learning model such as a transformer-based machine learning model such as a bidirectional encodes representations from transformers (BERT) model.

The term "behavioral-based embedding data object" may refer to a data object representing one or more features that are determined based at least in part on behavioral attributes demonstrated and/or exhibited by an agent while handling one or more communications. In particular embodiments, the behavioral-based embedding data object is generated based at least in part on data describing recorded emotions expressed by the agent while handling the communication(s). In addition, in particular embodiments, the behavioral-based embedding data object is generated based at least in part on other behavioral attributes observed of the agent while handling the communication(s) such as, for example, percentage of a communication in which the agent was conversing, amount of time in which the agent was not conversing (e.g., was silent), number of times an empathy cue appeared during the conversation, number of times an energy cue appeared during the conversation, and/or the like. In various embodiments, the behavioral-based embedding data object is configured as a vector of feature values representing various behavioral features inferred from the behavioral attributes demonstrated by the agent while handling the communication(s). Accordingly, in various embodiments, the behavioral-based embedding data object serves in a functional role to represent the relevant behavioral features demonstrated by the agent while handling the communication(s) that can be used, for example, in classifying an agent into an appropriate agent group.

The term "behavioral detection data object" may refer to a data object representing a behavioral attribute observed and/or detected for an agent associated with an agent profile during a communication associated with a communication data object. For example, a recorded/detected emotional expression of an agent observed during a communication may be considered a behavioral attribute represented by a behavioral detection data object. In various embodiments, one or more behavioral detection data objects may be identified for one or more communications that are used in generating a behavioral-based embedding data object for the agent. For instance, in particular embodiments, a speech and/or text analytics model may be used in analyzing the audio and/or text transcript of a communication such as, for example, a voice call or chat, to detect emotions expressed by the agent while handling the communication in order to identify one or more behavioral detection data object(s) for the communication. Accordingly, in various embodiments, other recorded data items may be used in identifying behavioral attributes exhibited by an agent during a communication such as, for example, behavioral attributes observed and recorded by quality assurance personnel associated with a call center environment.

The term "behavioral processing machine learning model" may refer to a data object that describes parameters and/or hyper-parameters (e.g., defined operations) of a model configured for processing one or more behavioral detection data objects for an agent to generate a behavioral-based embedding data object for the agent. In various embodiments, the behavioral processing machine learning model may be configured as a supervised or an unsupervised machine learning model. For instance, in particular embodiments, the behavioral processing machine learning model may be a deep learning model such as, for example, one or more conventional recurrent neural networks (RNNs), gated recurrent unit neural networks (GRUs), long short-term memory neural networks (LSTMs), and/or the like. Accordingly, the behavioral processing machine learning model may generate the behavioral-based embedding data object as a vector of feature values representing various behavioral features identified from the behavioral attributes demonstrated by the agent while handling a plurality of communications based at least in part the one or more behavioral detection data objects.

The term "agent feature merger machine learning model" may refer to a data object that describes parameters and/or hyper-parameters (e.g., defined operations) of a model configured for processing a group of embedding data objects for an agent (e.g., a transcription-based embedding data object and a behavioral-based embedding data object for an agent) to generate an agent feature data object for the agent. For instance, in particular embodiments, the agent feature merger machine learning model may be configured to combine the transcription-based embedding data object and the behavioral-based embedding data object into the agent feature data object via concatenation, integration, merger, hashing, and/or the like. For example, the transcription-based embedding data object and behavioral-based embedding data object may both comprise vectors of feature values and the agent feature merger machine learning model may be configured to combine the feature values found in the vectors into a combined vector representing the agent feature data object. Accordingly, in various embodiments, the agent feature data object may be a vector of feature values representing different semantic and/or behavioral features expressed and/or demonstrated by an agent while handling one or more communications.

The term "top agent performer data object" may refer to a data object representing a performance of an agent profile deemed to be a top performer with respect to one or more target performance metrics (e.g., in one or more agent groups). In various embodiments, the top agent performer data object represents one or more performance features determined based at least in part on performance feature(s) for multiple agents that have been identified as providing high and/or superior performance in fielding one or more types of communications within one or more corresponding agent groups. Accordingly, in particular embodiments, the one or more performance features represented by the top agent performer data object may indicate those performance feature(s) that an agent who is fielding one or more types of communications should ideally possess to be a top performer based on one or more agent groups of the agent. For instance, in some embodiments, the top agent performer data object may be configured as a vector of feature values in which each feature value represents a measure for a particular performance metric with respect to a top performing agent.

The term "agent group identifier machine learning model" may refer to a data object that describes parameters and/or hyper-parameters (e.g., defined operations) of a model configured for processing the agent feature data object for an agent to identify an agent group data object for the agent. In various embodiments, the agent group identifier machine learning model may be a supervised or unsupervised machine learning model. For instance, in particular embodiments, the agent group identifier machine learning model may be a machine learning model such as a clustering model or classification model. For example, in some embodiments, the agent group identifier machine learning model may be a k-nearest neighbor (KNN) clustering model, a k-means clustering model, a mean shift clustering model, and/or the like. In various embodiments, the agent group data object represents a group of agents having similar features that makes the suitable to handle one or more types of communications. In some embodiments, the identified agent group data object for an agent may be used in identifying a top agent performer data object, where the top agent performer data object for an agent may then be used to evaluate the agent's performance. In addition, in some embodiments, the identified agent group data object for an agent may be used in identifying a party profile representing a party that can be used in conducting personalized training for the agent.

The term "agent assessment data object" may refer to a data object representing an inferred performance evaluation of an agent associated with an agent profile in handling one or more communications. In various embodiments, the inferred performance evaluation may be based at least in part on one or more assessments performed by individuals (e.g., quality assurance personnel) who have evaluated the agent's performance in handling the one or more communications. For example, in some embodiments, the inferred performance evaluation is generated from scorecards produced by the individuals who have evaluated the agent's performance in handling the one or more communications. In some embodiments, the scorecards may be automatically generated. In some embodiments, the scorecards may be configured to provide values (e.g., scores) for various performance metrics as determined by the individuals who have evaluated the agent's performance. In another example, the inferred performance evaluation is generated from one or more evaluations, such as surveys, provided by one or more parties who have engaged with the agent in one or more communications. In particular embodiments, the agent assessment data object is configured as a vector of feature values in which each feature value represents a measure of a particular performance metric with respect to the agent.

The term "comparison machine learning model" may refer to a data object that describes parameters and/or hyper-parameters (e.g., defined operations) of a model configured for processing an agent assessment data object for an agent and a top agent performer data object to generate one or more inferred performance gap data objects for the agent. Accordingly, in various embodiments, the comparison machine learning model is configured to conduct a comparison between the features values found in the agent assessment data object and the feature values found in the top agent performer data object to generate the one or more inferred performance gap data objects representing gaps (e.g., deficiencies) in the agent's performance with respect to a top performing agent. In particular embodiments, one or more performance metric recommendations may be provided to address the identified inferred performance gap data object(s). For example, the comparison machine learning model may identify an inferred performance gap data object with respect to the agent's average handle time for audio calls when compared to the average handle time for a top performing agent. Therefore, a performance metric recommendation may be generated for the agent to work on average handle time to improve his or her performance. In particular embodiments, the comparison machine learning model may be a supervised or unsupervised machine learning model. For instance, in some embodiments, the comparison machine learning model may be a machine learning model such as a support vector machine, a decision tree, a neural network, and/or the like. In other embodiments, the comparison machine learning model may be a rule-based model configured for applying rule-based logic in generating the one or more inferred performance gap data objects. For example, the rule-based logic may be configured for identifying gaps in performance based at least in part on measured differences in performance satisfying threshold values.

The term "performance metric recommendation" may refer to a data object that describes one or more inferred recommendations for an agent profile representing an agent, where the one or more inferred recommendations are determined based at least in part on output of a comparison machine learning model that is configured to process an agent assessment data object to generate one or more predictive inferences related to observed performance metrics of the agent profile. In various embodiments, the inferred recommendations can be based at least in part on inferred gap performance data objects representing gaps (e.g., deficiencies) in performance identified for the agent associated with the agent profile with respect to a top performing agent. In particular embodiments, the performance metric recommendations generated for an agent may be utilized in designing and/or conducting performance-related actions such as, for example, designing and/or conducting personalized training specifically tailored to help the agent address the performance gap data objects generated for the agent.

The term "party feature data object" may refer to a data object representing a characteristic feature collected, acquired, identified, measured, and/or the like (aka, identified) for a party who has engaged in one or more communications with agent(s). For example, a party feature data object may represent a characteristic feature of the party such as a demographic feature of the party, a purchase history feature of the party, a call history feature of the party, and/or the like. In various embodiments, one or more party feature data objects may be identified from various data sources for the party that are used in generating a party-based embedding data object for the party.

The term "party feature processing machine learning model" may refer to a data object that describes parameters and/or hyper-parameters (e.g., defined operations) of a model configured for processing one or more party feature data objects for a party to generate a party-based embedding data object for the party. In various embodiments, the party feature processing machine learning model may be configured as a supervised or an unsupervised machine learning model. For instance, in particular embodiments, the party feature processing machine learning model may be a deep learning model such as, for example, one or more conventional recurrent neural networks (RNNs), gated recurrent unit neural networks (GRUs), long short-term memory neural networks (LSTMs), and/or the like. Accordingly, in particular embodiments, the party feature processing machine learning model may generate the party-based embedding data object as a vector of feature values representing various characteristic features identified from various information gathered on the party.

The term "party feature merger machine learning model" may refer to a data object that describes parameters and/or hyper-parameters (e.g., defined operations) of a model configured for processing the transcription-based embedding data object and the party-based embedding data object for a party to generate a party feature data object for the party. For instance, in particular embodiments, the party feature merger machine learning model may be configured to combine the transcription-based embedding data object and the party-based embedding data object into the party feature data object via concatenation, integration, merger, hashing, and/or the like. For example, the transcription-based embedding data object and party-based embedding data object may both comprise vectors of feature values and the party feature merger machine learning model may be configured to combine the feature values found in the vectors into a combined vector representing the party feature data object. Accordingly, in various embodiments, the party feature data object may be a vector of feature values representing different characteristic features of a party who has engaged in one or more types of communications with agent(s).

The term "recommended talking point data object" may refer to a data object representing a recommended talking point identified as suitable for delivering to a particular party who has and/or will engaged in one or more types of communications with agents. For example, a recommended talking point may involve a particular topic that may be of interest to the party in discussing while engaged in a communication with an agent. In another example, a recommended talking point may describe particular information that should be conveyed by an agent to the party while engaged in a communication. As detailed further herein, the recommended talking point data objects may be used in various embodiments in designing and conducting personalized simulation training for a particular agent so that the recommended talking point(s) represented by the one or more recommended talking point data objects can be incorporated into the personalized simulation training conducted with the agent.

The term "recommended talking point identifier machine learning model" may refer to a data object that describes parameters and/or hyper-parameters (e.g., defined operations) of a model configured for processing the party feature data object for a party to generate a plurality of recommended talking point data objects identifying recommended talking points for directing a conversation with the party while engaged in a communication with an agent. In various embodiments, the recommended talking point identifier machine learning model may be a supervised or unsupervised machine learning model. For instance, in particular embodiments, the recommended talking point identifier machine learning model may be a machine learning model such as a support vector machine, decision tree, neural network, and/or the like. In some embodiments, the recommended talking point identifier machine learning model may be a multi-case classifier model configured for generating the plurality of recommended talking point data objects based at least in part on labeling a set of recommended talking points and identifying those labeled recommended talking points satisfying a threshold probability value.

Technology Framework Overview

Embodiments of the disclosure provide a novel technology framework for intelligently generating one or more performance metric recommendations for an agent who may be fielding communications for a contact center. For example, the agent may be employed to work in a contact center for a laptop computer manufacturer as technical support personnel and field inbound voice calls from customers who have purchased laptop computers and are having technical issues. In another example, the agent may be employed to work in a contact center for an e-commerce retailer. Here, the agent may initiate Web chats with potential customers who are visiting the e-commerce retailer's website to provide special purchase offers and/or to answer questions the customers may have on different products being sold through the website. Accordingly, those of ordinary skill in the art will recognize in light of this disclosure that the agent may be fielding communications for various types of contact centers, and the communications may be using various channels of communication.

As a result of the diversity of contact center environments, as well as the diversity of types of communications an agent may need to handle, many contact center agents are required to have a variety of skills to be successful in handling communications for a contact center. For example, a contact center agent may be required to have verbal skills to allow the agent to converse clearly and concisely on voice calls with parties who may have called into or received a call from the contact center. In addition, a contact center agent may be required to have writing skills to allow the agent to converse clearly and concisely on chats and/or text message exchanges with parties. Further, a contact center agent may be required to have sufficient knowledge of various topics so that the agent can adequately and efficiently discuss such topics with parties on various communications. Those of ordinary skill in the art can envision a multitude of skills that may be required of a contact center agent to enable the agent to successfully handle communications for a contact center.

However, the level of competency agents may have with respect to a particular skill can vary greatly across a group of agents. Therefore, a conventional "one-size-fits-all" approach applied by many contact centers in training all agents using the same training materials for a set of skills, regardless of an agent's competency with respect to any one skill in the set, can be highly ineffective. Furthermore, conventional approaches employed by many contact centers are not equipped to measure and identify an agent's competency with respect a set of skills to facilitate personalized training for the agent to address deficiencies the agent may have for a particular skill.

Therefore, turning now to FIG. 1, various embodiments of the disclosure provide a technology framework 100 that utilizes various artificial intelligence technologies to intelligently generate performance metric recommendations for an agent profile associated with an agent based at least in part on the agent's performance with respect to different skills. Accordingly, such performance metric recommendations can be used in designing and conducting personalized training of the agent to address deficiencies (e.g., gaps) the agent may have with respect to individual skills found in a set of skills the agent may need in fielding communications for a contact center.

Thus, in various embodiments, the technology framework 100 is configured to enable intelligently evaluating an agent's performance in fielding one or more communications with respect to different target performance metrics so that personalized recommendations can be made on areas that the agent needs to work on to improve his or her performance. Therefore, data on various aspects may be gathered for one or more communication data objects associated with one or more communications handled by the agent to use in evaluating the agent's performance. For instance, in some embodiments, text transcripts 111 of the words spoken by the agent and/or the other parties on the one or more communications may be generated for the communication data object(s). For example, the one or more communications may involve voice calls and text transcripts 111 may be generated from the audio 110 (e.g., audio files associated with the communication data object(s)) of the voice calls using some type of automatic speech recognition technology.

In some embodiments, the technology framework 100 may involve processing the text transcripts 111 using a transcription processing machine learning model to generate a transcription-based embedding data object. Here, the transcription-based embedding data object may be configured as a vector of feature values representing various features identified from the words spoken by the agent and/or party while engaged in the communication(s). In particular embodiments, the transcription processing machine learning model may be configured for performing natural language processing on the text transcripts 111 to generate the transcription-based embedding data object. For example, in some embodiments, the transcription processing machine learning model may be configured as a deep learning model such as a BERT model. Accordingly, in various embodiments, the transcription-based embedding data object may serve in a functional role in the technology framework 100 to represent relevant semantic features derived from the words spoken on the communication(s).

In addition, in some embodiments, performance evaluations 112 generated by various sources may be gathered that are associated with the agent profile for the agent. For example, quality assurance personnel working for the contact center may have reviewed one or more of the communication(s) and provided one or more evaluations on the agent's performance in handling the communication(s). Such evaluation(s) may be represented by an agent assessment data object 115 associated with the agent profile. In another example, parties who were engaged with the agent in the one or more communications may provide evaluations through the use of a survey. The results of the surveys may also be represented by the agent assessment data object 115 associated with the agent profile. Accordingly, depending on the circumstances, the agent assessment data object 115 may provide data on specific performance metrics and/or may provide more generalized data on the agent's performance. For example, in particular embodiments, an agent assessment data object 115 may be configured as a vector of feature values in which each feature value represents an inferred measurement of a specific performance metric.

Further, in some embodiments, emotions 113 expressed by the agent while handling the one or more communications may be gathered. For instance, in particular embodiments, one or more machine learning models may be used in detecting emotions expressed by the agent while handling the communication(s). Accordingly, the detected emotions may be represented as behavioral detection data objects. For example, where the one or more communications involve audio such as voice call(s), one or more machine learning models may be configured for processing components of the audio of the voice call(s) to generate one or more behavioral detection data objects representing emotions expressed by the agent while handling the call(s). Such components may include, for example, pitch, tone, speed, power of voice, and/or the like. In another example, where the one or more communications involve text such as chats and/or text message exchanges, one or more rule-based models may be configured for generating one or more behavioral detection data objects representing emotions expressed in the text based at least in part on grammatical and logical rules. For instance, such rule-based models may encompass keyword recognition and use of emotion dictionaries or lexicons.

Other sources of data may be gathered in various embodiments such as, for example, other behavioral attributes demonstrated by the agent while handling the one or more communications. Accordingly, these behavioral attributes may also be represented as behavioral detection data objects. Such behavioral attributes may include, for example, percentage of communication in which the agent was conversing, average speaking rate on communications involving voice, periods of non-conversing (e.g., silence), number of times an empathy cue appeared, number of times an energy cue appeared, and/or the like. Accordingly, depending on the embodiment, such behavioral attributes may be gathered via monitoring technology and/or an individual (e.g., quality assurance personnel) who evaluates the communication(s).

In particular embodiments, the technology framework 100 may involve processing the behavioral detection data objects using a behavioral processing machine learning model to generate a behavioral-based embedding data object. Here, the behavioral-based embedding data object may be configured as a vector of feature values representing behavioral attributes demonstrated by the agent while handling the communication(s). For instance, in some embodiments, the behavioral processing machine learning model may be configured as a deep learning model such as, for example, one or more conventional RNNs, GRUs, LSTMs, and/or the like. In various embodiments, the behavioral-based embedding data object may serve in a functional role in the technology framework 100 to represent the relevant behavioral features demonstrated by the agent while handling the communication(s).

In addition, in particular embodiments, the technology framework 100 may involve generating an agent feature data object based at least in part on the transcription-based embedding data object and the behavioral-based embedding data object generated for the agent profile associated with the agent. Accordingly, in these embodiments, the agent feature data object may be generated via an agent feature merger machine learning model. The agent feature merger machine learning model may be configured to combine the transcription-based embedding data object and the behavioral-based embedding data object into the agent feature data object via a process such as concatenation, integration, merger, hashing, and/or the like. For example, the agent feature merger machine learning model may be configured to combine the feature values found in the transcription-based embedding data object and the behavioral-based embedding data object into a combined vector representing the agent feature data object. In various embodiments, the agent feature data object may be a vector of feature values representing different semantic and/or behavioral features expressed and/or demonstrated by the agent while handling the communication(s).

Accordingly, in some embodiments, the agent feature data object generated for the agent profile associated with the agent may be used in identifying an agent group data object for the agent profile. The agent group data object represents a group of agents having similar features as the agent represented in the agent feature data object with respect to fielding one or more types of communications. In particular embodiments, the agent group data object may be identified by using an agent group identifier machine learning model. Here, the agent group identifier machine learning model may be a machine learning model such as a clustering model or classification model. For example, the agent group identifier machine learning model may be a KNN clustering model, a k-means clustering model, mean shift clustering model, and/or the like.

In various embodiments, the technology framework 100 involves evaluating the agent's performance based at least in part on comparing the agent's performance with that of the performance of a top performing agent. Here, a top performing agent may represent an agent who can ideally perform at a high level (e.g., top five percent) for various target performance metrics involved in handling communications for the contact center. For example, one such target performance metric may be average handle time for a communication. Average handle time is the amount time an agent takes on average in handling a communication. Ideally, contact centers would like for agents to have low average handle times so that the agents are able to handle a maximum number of communications over a given time period (e.g., over a work shift). However, contact centers also want the agents to have high enough average handle times that the agents are taking the required amount of time on the communications to address the parties' needs and/or concerns, Therefore, oftentimes, a contact center may have an "ideal" or "optimum" average handle time for agents to handle communications.

Similarly, a target performance metric that may be considered by contact centers for communications involving text (e.g., chat and/or text message exchange) is the frequency at which the agent commits typographical errors in the text. Therefore, a measure for this target performance metric in the form of a numeric value (e.g., percentage) may be determined to indicate the agent's performance in committing (or not committing) typographical errors when typing text in communications with parties.

In general, no one actual agent in a contact center will be considered a top performing agent for every single performance metric of interest. Therefore, various embodiments of framework 100 make use a top agent performer data object 114 that represents the various target performance metrics that a top performing agent should possess. For instance, in particular embodiments, the top agent performer data object 114 may be configured as a vector of feature values in which each feature value represents an optimal measure for a particular performance metric. For example, one of the feature values provided in the top agent performer data object 114 may provide the optimum average handle time in minutes. Accordingly, this particular feature value found in the top agent performer data object 114 can be used in evaluating an actual agent's performance with respect to average handle time.

In various embodiments, multiple top agent performer data objects 114 may be defined to represent different types of top performing agents. For example, multiple top agent performer data objects 114 may be defined for top performing agents handling different types of communications. In some instances, the different top agent performer data objects 114 may represent different target performance metrics. For example, a target performance metric for agents who are fielding voice calls may be level of voice clarity while handling calls. However, a target performance metric for committing typographical errors in text would be of no interest for agents who are fielding the voice calls. Accordingly, in particular embodiments, the technology framework 100 may be configured to identify an applicable top agent performer data object 114 for the agent profile representing the agent based at least in part on the agent group data object identified for the agent profile.

At this point, in various embodiments, the technology framework 100 is configured to carry out the evaluation of the agent's performance by comparing the agent assessment data object 115 generated for the agent profile associated with the agent to the top agent performer data object 114 identified for the agent. Specifically, in particular embodiments, a comparison machine learning model is used to process the agent assessment data object 115 and top agent performer data object 114 to generate one or more inferred performance gap data objects for the agent. Here, the one or more inferred performance gap data objects may represent gaps (e.g., deficiencies) in the agent's performance with respect to a top performing agent. In some embodiments, the comparison machine learning model may be a machine learning model such as a support vector machine, decision tree, neural network, and/or the like. In other embodiments, the comparison machine learning model may be a rule-based model configured for applying rule-based logic in generating the one or more inferred performance gap data objects. For example, the rule-based logic may be configured for identifying gaps in performance based at least in part on measured differences in performance satisfying threshold values.

For instance, a feature value found in both the agent assessment data object 115 and the top agent performer data object 114 may be a measurement for average handle time. The feature value found in the agent assessment data object 115 may indicate a measurement of twelve minutes as the average handle time for the agent. The feature value found in the top agent performer data object 114 may indicate a measurement of eight minutes as the average handle time for a top performing agent. A threshold value of three minutes may be established for identifying a deficiency that warrants generation of a performance gap data object for the target performance metric. Therefore, in this example, the comparison machine learning model would generate a performance gap data object representing the target performance metric average handle time based at least in part on the difference between the feature values found in the agent assessment data object 115 and the top agent performer data object 114 being four minutes, and thus satisfying the threshold value. In particular embodiments, the technology framework 100 may involve providing one or more performance metric recommendations to address the identified inferred performance gap data object(s). For example, a performance metric recommendation may be provided for the agent to work on average handle time to improve his or her performance to address the inferred performance gap data object with respect to the agent's average handle time when compared to the average handle time for a top performing agent.

Accordingly, the performance metric recommendations may be used in various embodiments in designing and/or conducting personalized training specifically tailored to help the agent address the inferred performance gap data objects generated for the agent. In particular embodiments, the personalized training may involve personalized simulation training characterized by a simulation communication data object between the agent associated with the agent profile and a party profile representing a party based at least in part on one or more recommended talking point data objects 125 identified for the party. A recommended talking point data object 125 may represent a recommended talking point identified as suitable for delivering to the party represented by the party profile during the simulation training. For example, a recommended talking point may involve a particular topic that may be of interest to the party to discuss during the simulation or particular information that should be conveyed by the agent to the party during the simulation. For instance, a recommended talking point may be for the agent to offer the party an incentive (e.g., coupon) during the simulation to entice the party to purchase a product.

Accordingly, the personalized simulation training may involve conducting a simulated communication, as represented by the simulation communication data object, taking place between the agent and the party represented by the party profile. Here, in particular embodiments, the simulation may be conducted using virtual technology to represent the party. Accordingly, in some embodiments, the virtual technology may be configured to generate a virtual version of the party (virtual party) based at least in part on one or more features represented by the party profile and/or a party feature data object generated for the party profile. In addition, the simulation may be designed in various embodiments to incorporate features tailored to address the performance metric recommendations identified for the agent, as well as incorporate the recommended talking points identified by the recommended talking point data objects 125. Thus, the simulation training can be viewed as personalized for the agent in the sense that the training is designed and/or conducted specifically to address the one or more inferred performance gap data objects identified for the agent.

In some embodiments, the personalized simulation training may be configured to provide personalized improvement 130 to the agent through the use of a subject specialized module 135 and a role play module 140. The subject specialized module 135 may be configured to identify simulation components for conducting the simulation based at least in part on the recommended talking point data objects 125. While the role play module 140 may be configured to identify the simulation components for conducting the simulation based at least in part on the one or more performance metric recommendations identified for the agent and then conduct the simulation based at least in part on the simulation components for both the recommended talking point data objects 125 and performance metric recommendations accordingly. In addition, the personalized simulation training may be configured in some embodiments to provide the agent with a score ranking/tracking 145 with respect to the agent's progress on addressing the performance gaps identified in the inferred performance gap data objects. As a result, the technology framework 100, in conjunction with the personalized simulation training, can serve as a feedback loop 150 in facilitating the agent's improvement in performance with respect to one or more performance metrics.

Further, in particular embodiments, the technology framework 100 may be configured to identify the party to use in the personalized simulation training based at least in part on the agent group data object identified for the agent profile associated with the agent. In addition, in particular embodiments, the technology framework 100 may be configured to identify the recommended talking point data objects 125 for each of the parties that can be used in the personalized simulation training. Accordingly, in some embodiments, the parties (party profiles) may be based at least in part on actual parties who have engaged with agent(s) in one or more communications.

Therefore, in these embodiments, the technology framework 100 may involve gathering data on various aspects for one or more communication data objects representing one or more communications in which an actual party was involved. Similar to agents, in some embodiments, text transcripts of the words spoken by the party and/or the agents on the one or more communications may be generated for the communication data object(s) in a similar fashion as used to generate the text transcripts 111 for an agent. In addition, a transcription processing machine learning model may be used in generating a transcription-based embedding data object for the party.

Further, in various embodiments, data may be gathered on the party that may not necessarily be drawn directly from the communications(s). For instance, in particular embodiments, the technology framework 100 may involve gathering data from sources that may be used to storage information associated with the party that is not extracted from the communication(s). For example, the contact center may be associated with a health insurance provider. Here, the health insurance provider may collect and store information 120 on various policy holders such as, for example, medical claims submitted by the policy holders, lab results from medical tests conducted for the policy holders, pharmacy information, lifestyle and fitness choices, and/or the like. Such information may be helpful in identifying talking points of interest for the party. In addition, other information such as demographic information on age, income level, gender, residency, and/or the like may be gathered.

Accordingly, the gathered data may be represented by one or more party feature data objects in particular embodiments and these data object(s) may be processed by a party feature processing machine learning model to generate a party-based embedding data object for the party. For instance, the party feature processing machine learning model may be a deep learning model such as, for example, one or more RNNs, GRUs, LSTMs, and/or the like. In some embodiments, the party feature processing machine learning model may generate the party-based embedding data object as a vector of feature values representing various characteristic features for the party identified from the various data gathered on the party.

In particular embodiments, the technology framework 100 generates a party feature data object based at least in part on the transcription-based embedding data object and the party-based embedding data object generated for the party profile associated with the party. In these embodiments, the party feature data object may be generated via a party feature merger machine learning model. Similar to the agent feature merger machine learning model, the party feature merger machine learning model may be configured to combine the transcription-based embedding data object and the party-based embedding data object into the party feature data object via a process such as concatenation, integration, merger, hashing, and/or the like. For example, the party feature merger machine learning model may be configured to combine the feature values found in the transcription-based embedding data object and the party-based embedding data object into a combined vector representing the party feature data object. Accordingly, in some embodiments, the party feature data object may be a vector of feature values representing different characteristic features of the party.

Accordingly, in various embodiments, the party feature data object may then be used in generating the recommended talking point data objects 125 for the party profile associated with the party. Specifically, in particular embodiments, a recommended talking point identifier machine learning model may be configured to process the party feature data object to generate the recommended talking point data objects 125 for the party profile. For instance, in particular embodiments, the recommended talking point identifier machine learning model may be a machine learning model such as a support vector machine, decision tree, neural network, and/or the like. For example, in some embodiments, the recommended talking point identifier machine learning model may be a multi-case classifier model configured for generating the recommended talking point data objects 125 based at least in part on labeling a set of recommended talking points and identifying those labeled recommended talking points satisfying a threshold probability value.

For example, the set of recommended talking points may include talking points such as offering incentives, such as gift cards, to entice the party, discussing various products and/or services that may be identified as of interest to the party, discussing privacy concerns with the party, discussing past communications that party may have had with the contact center, and/or the like. Here, the recommended talking point identifier machine learning model may generate the recommended talking point data objects 125 based at least in part on a probability value generated for each of these set of recommended talking points satisfying a threshold probability value.

As previously discussed, the generated recommended talking point data objects 125 may then be used in designing and/or conducting personalized simulation training for an agent involving the party (e.g., virtual party) represented by the party profile associated with the recommended talking point data objects 125. Further discussion is now provided with respect to the various components that make up the technology framework 100 according to various embodiments.

Exemplary Technical Contributions

Embodiments of the disclosure provide a novel technology framework 100 for intelligently generating one or more performance metric recommendations for an agent who may be fielding communications for a contact center. As previously noted, many contact center agents are required to have a variety of skills to be successful in handling communications for a contact center due to the diversity of contact center environments, as well as the diversity of types of communications an agent may need to handle. Accordingly, the level of competency any one agent may have with respect to a particular skill can vary greatly across a group of agents. Therefore, a conventional "one-size-fits-all" approach applied by many contact centers in training all agents using the same training materials for a set of skills, regardless of an agent's competency with respect to any one skill in the set, can be highly ineffective. Furthermore, conventional approaches employed by many contact centers are not equipped to measure and identify an agent's competency with respect a set of skills to facilitate personalized training for the agent to address deficiencies the agent may have for a particular skill.

Accordingly, various embodiments of the disclosure provided herein address many of the technical disadvantages encountered using conventional processes and systems in identifying gaps in the performance of agents who are employed in contacts center to handle communications and conducting training of agents to address these gaps in performance. Most conventional processes and systems do not have the technical capabilities to recognize performance gaps and/or issues on an agent-by-agent basis. Instead, most conventional processes and systems identify performance gaps for agents using non-technical approaches such as having quality assurance personnel review communications conducted by agents and provide an evaluation of the agents' performances. However, such approaches can be error prone and inconsistent in that oftentimes different personnel will conduct evaluations based on different (subjective) criteria that do not always lead to consistent and accurate assessment of an agent's skill with respect to any given skill. As a result, an agent's gaps in performance may be identified much differently based on the specific quality assurance personnel who conducts the evaluation of the agent's performance.

In addition, many contact centers' conventional practices for training agents to address gaps in performance oftentimes make use of standardized training that is the same for every agent, regardless of the level of skill (or lack thereof) the agent may have with respect to any particular skill. Therefore, agents who may have a small gap in performance for a particular skill may be required to go through the same training to address the gap as do agents who may have a much larger gap in performance for the same skill. This leads to inefficiencies in training agents with respect to agents' time due to having to take part in "over" training to address a performance gap that may be relatively small, as well as with respect to the resources used in conducting the training of these agents such as training personnel and systems.

However, various embodiments of the disclosure provide a novel technology framework 100 that can identify performance gaps for individual agents with respect to individual skills of interest, and at a level of specificity to enable personalized training of individual agents to address the identified gaps in performance. Accordingly, embodiments of the technology framework 100 accomplish identifying gaps in performance for specific, individual skills for agents and personalized training of individual agents to address these gaps in performance through the use of novel approaches involving automation and artificial intelligence technologies. Thus, embodiments of the disclosure overcome many of the technical disadvantages of conventional training approaches used by many contact centers in training agents.

Machine learning models are used in various embodiments to identify performance gaps (deficiencies) in skills for individual agents, as well as in providing performance metric recommendations that can be used in designing and conducting personalized training for individual agents. The use of such models improve the accuracy and precision of identifying gaps in performance for individual skills for an agent. Training can then be designed and conducted in a personalize manner to address the identified gaps in performance. As a result, an agent's performance in fielding communications for a contact center can be optimally improved and can lead to higher efficiencies for the contact center.

Furthermore, the machine learning models used in various embodiments carry out complex mathematical operations in identifying performance gaps with respect to different skills for an individual agent that cannot be performed by the human mind. Accordingly, the inventive solution provided herein can reduce the computational load of various contact center systems by avoiding inefficient throughput of communications, as well as avoiding follow-up communications from parties that the contact center systems must handle due to agents' failures to adequately address the parties' initial communications due to deficiencies in skills. Furthermore, various embodiments of the present disclosure enhance the efficiency and speed of various computing systems by providing the ability to computationally manage communications in an efficient manner, and make important contributions to the various computational tasks that utilize realtime/expedited processing of communications in contact center environments. In doing so, various embodiments of the present disclosure make major technical contributions to improving the computational efficiency and reliability of various contact center systems and procedures for carrying out these tasks. This in turn translates to more improved and computationally more efficient software systems.

Various embodiments of the present invention enable more reliable handling of inbound communications for a call center in a manner that is likely to decrease the number of repeat inbound communications resulting from lack of satisfactory responses to initial inbound communications. This in turn reduces the overall number of inbound communications received by a call center system given a fixed number of inbound communication parties, which reduces the computational/processing/resource load on the processing resources of the call center system, and thus improves the computational efficiency and operational reliability of the noted call center system. In doing so, various embodiments of the present invention improve the computational efficiency and operational reliability systems and make important technical contributions to the field of call center resource load management and/or to the field of call center operational load balancing.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some exemplary embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Contact Center Architecture

Figure 2:
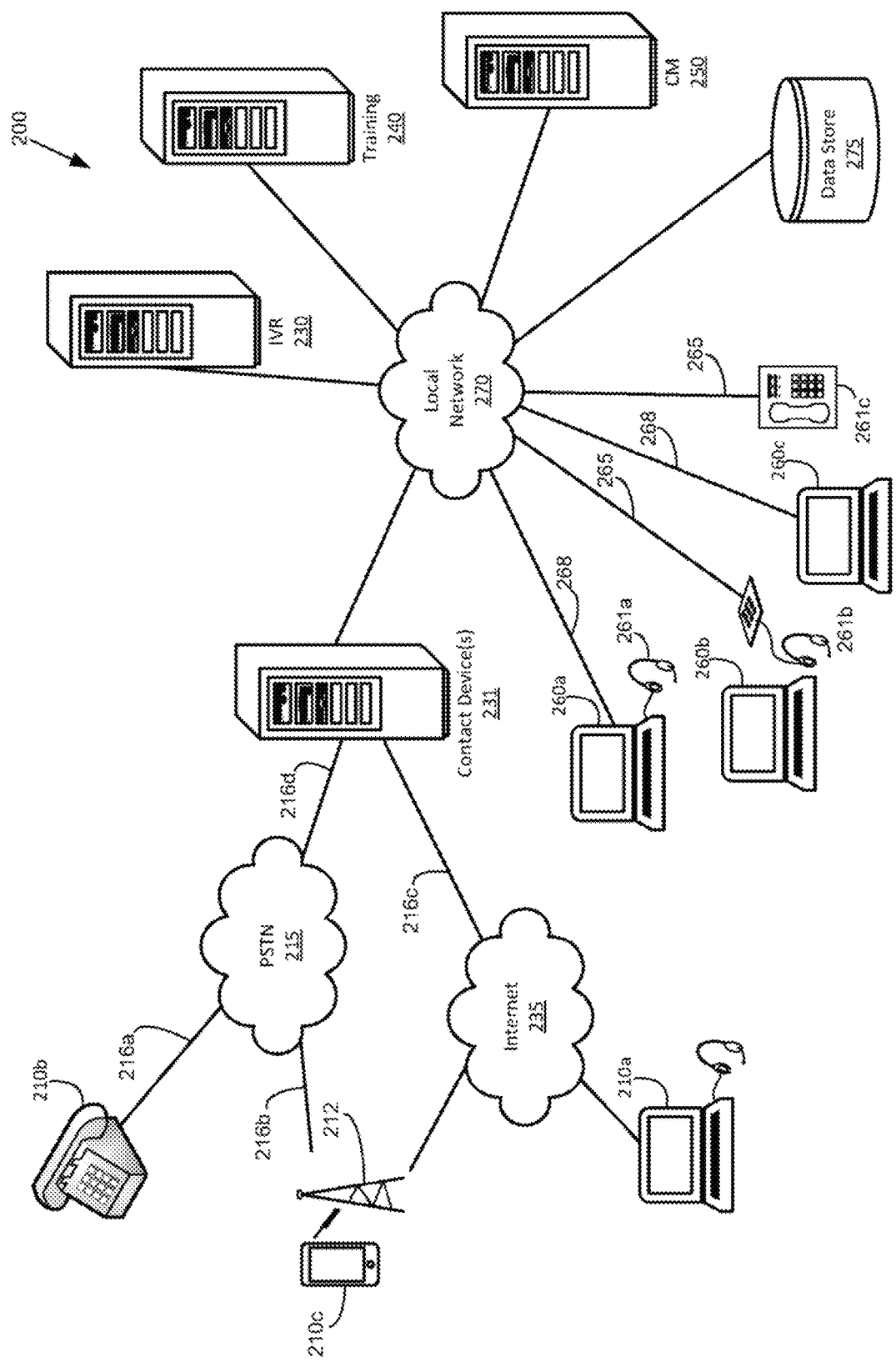
FIG. 2 is a diagram of a contact center architecture that can be used in conjunction with various embodiments of the present disclosure.

FIG. 2 provides an illustration of a contact center architecture 200 that may be used in accordance with various embodiments of the disclosure. The contact center architecture 200 shown in FIG. 2 may process various channels of communication such as audio (voice) calls, video calls, facsimiles, emails, text messages, Web chat sessions, and/or the like that can be inbound-only, outbound-only, or a combination of both (sometimes referred to as a "blended" contact center). In particular instances, the contact center may be referred to as a call center. However, for purposes of this disclosure, the term "contact center" is used throughout, although it is understood that the two are synonymous. Here, a communication represents an interaction taking place between a party and the contact center (e.g., component within the contact center and/or agent who is employed by the contact center).

In some embodiments, the contact center may handle communications originating from a remote party or initiated to a remote party. Thus, the term "party," without any further qualification, refers to an individual associated with a communication processed by the contact center, where the communication is either received from or placed to the party. For example, the party may simply be a caller who has placed a called into the contact center.

Depending on the embodiment, communications may originate to or be received from parties that use a variety of different devices. For instance, a party may receive or place a voice call using a conventional analog telephone 210b connected to a public switched telephone network ("PSTN") 215 using an analog plain old telephone service ("POTS") line 216a. The call may be routed by the PSTN 215 and may comprise various types of facilities 216d, including, but not limited to: T1 trunks, SONET based fiber optic networks, ATM networks, and/or the like. Various types of routers, switches, bridges, gateways, and other types of equipment may be involved in the processing of the calls.

In addition, a party may receive or place a communication using a device such as a desktop or laptop computer 210a, a smart phone 210c, mobile phone, tablet, or other mobile device. Depending on the device, these communications may be placed or received via an Internet provider 235 and/or wirelessly via a mobile service provider ("MSP") 212. For instance, communications may be routed to the PSTN 215 using an integrated services digital network ("ISDN") interface 216b or other type of interface that is well known to those skilled in the art. While in other instances, the MSP 212 may route communications as packetized data to/from an Internet provider 235 using Internet-based protocols. For convenience, unless indicated otherwise, the term "trunk" refers to any type of facilities providing communication to, or from, the contact center, regardless of the type of protocol or technology used. Specifically, a "trunk" is not limited to time-division multiplexing ("TDM") technology. Those skilled in the art will recognize that a variety of protocols and facilities may be used to convey communications.

Accordingly, the contact center may implement various contact devices 231 for initiating and receiving communications based at least in part on the channel of communication. For instance, in various embodiments, communications such as inbound calls are received from parties by a contact device 231 such as an automatic call distributor ("ACD"). In particular embodiments, the ACD may be a specialized switch for receiving and routing inbound calls under various conditions. Further, the ACD may be embodied as a dedicated form of equipment readily available from various manufacturers, or the ACD may be a so-called "soft switch" comprising a suitable programming module executed by a processing device to perform the necessary functions. The ACD may route an incoming call over contact center facilities 265, 268 to an available agent. Depending on the embodiment, the facilities 265, 268 may be any suitable technology for conveying the call, including but not limited to a local area network ("LAN"), wide area network ("WAN"), ISDN, and/or conventional TDM circuits. The exact details typically depend in part on the technology used. For example, in one embodiment, first facilities 265 may be analog or proprietary voice communication technology whereas second facilities 268 may be SIP oriented. As may be appreciated, there are various technologies and configurations that are possible. In addition, the facilities 265, 268 may be the same or different from the facilities used to transport the call and/or message to the ACD.

Depending on the embodiment, the ACD may place a call in a queue if there is no suitable agent available. For instance, the ACD may route a call initially to an interactive voice response component ("IVR") 230. The IVR 230 may provide prompts (prompt information data objects) to the party on the call. In particular instances, these prompts may solicit information from the party and the IVR 230 may collect and analyze responses from the party in the form of dual-tone multiple frequency ("DMTF") tones and/or speech. In addition, the IVR 230 may be used to identify metadata, such as, for example, prompting the party to provide account information or otherwise obtain information used to service the call. Further, in particular embodiments, the IVR 230 may interact with other components, such as a data store 275 and/or other backend system, to retrieve or provide information for processing the call.

Continuing on, in various embodiments, communications such as outbound calls may be sent using another contact device 231 such as a dialer (e.g., predictive dialer). Again, the dialer may be embodied as a dedicated form of equipment readily available from various manufacturers, or the dialer may be a so-called "soft switch" comprising a suitable programming module executed by a processing device to perform the necessary functions. Accordingly, a predictive dialer is a type of dialer that may originate calls to multiple telephone numbers simultaneously with the expectation that agents will be available to handle one or more of the calls that are answered. In various embodiments, the predictive dialer makes use of one or more algorithms to determine how and when to dial/text numbers so as to minimize the likelihood of a party being placed in a queue while maintaining target agent utilization.

Once a call is answered by a party, the dialer may connect the call initially to the IVR 230 and then to an available agent using one or more facilities 265, 268. Other types of dialing methods may be used such as preview dialing in which information about an account is displayed to an agent to review prior to the dialer originating a call to the account. In this way, when the party answers the call, the agent can interact with the party in an effective way. Further, in particular embodiments, the dialer may be configured so that it attempts to establish communication with parties using a calling list of telephone numbers that is stored in a data store 275.

Depending on the embodiment, other contact devices 231 may be used for originating and/or receiving other channels of communication such as Web chats, emails, text messages, and/or the like. For example, the contact center may make use of a web server to host Web pages and interact with parties via Web chats. In addition, the contact center may make use of an email server to receive and send emails from parties. While in other embodiments, the contact center may convey and/or receive text messages to/from a gateway instead of an ACD or dialer, which then conveys the messages to the Internet provider 235 and on to a MSP 212. In these particular embodiments, such a gateway may provide a way for the contact center to send and/or receive text messages that are not in a native text protocol and can be accepted or conveyed by the MSP 212.

Again, information associated with these other channels of communication may be stored in the data store 275. In addition, like calls, a transfer-like operation may be used in various embodiments to connect a communication that has been answered and/or received with an automated prompt system and/or available agent, or if an agent is not available, a queueing operation may be used to place the communication in a queue until an agent is available.

Accordingly, in various embodiments, the contact center may make use of a training component 240 (e.g., a training server) used in conducting training of agents. Here, in particular embodiments, the training may involve various electronic content and/or processes used in training agents. For instance, in some embodiments, the training component 240 may provide training in for the form of simulation training allowing agents to engage in simulated communications with parties to help improve their skills. In addition, quality assurance personnel may make use of the training component 240 in reviewing and evaluation agents' performances on various communications.

Further, in various embodiments, the contact center may make use of a communication monitoring component ("CM") 250 to monitor communications and to direct the contact devices 231 on routing communications to various components, queues, and/or agents. Depending on the embodiment, the CM 250 may keep track of the availability of various components, as well as which agents who are available to handle communications and what channels of communications these agents are able to handle. Furthermore, the CM 250 may gather various data that can be used in evaluating agents' performances with respect to various performance metrics of interest. Accordingly, such data may be stored and processed to identify gaps in performance with respect to different metrics for various agents.

An agent at the contact center typically uses a computing device 260a-260c, such as a personal computer, and a voice device 261a-261c to handle communications. The combination of computing device 260a-260c and voice device 261a-261c may be referred to as a "workstation." However, in particular embodiments, the computing device 260a-260c may also handle voice (e.g., VoIP) or voice capabilities may not be needed so that reference to an agent's "workstation" may only refer to a computing device 260a-260c without the use of a separate voice device 261a-261c.

Agents typically log onto their workstations prior to handling communications and this allows the contact center to know which agents are available to potentially receive communications. In particular embodiments, the contact center may also maintain information on each agent's skill level that may be used to route a specific communication to an agent or group of agents having the same skill level. In particular instances, if a suitable agent is not available to handle a particular communication, the contact center (e.g., the contact device 231) may queue the communication for the next available suitable agent.

Depending on the embodiment, interaction between a contact device 231, as well as other components within the contact center architecture 200, and agent's workstation may involve using a local area network ("LAN") 270. In addition, in particular embodiments, an agent may interact with components that provide information to the agent's workstation. For example, when a communication is directed to an agent, information above the party on the communication may be presented to the agent's computing device 260a-260b over the LAN 270 using facilities 268.

Although a number of the above entities may be referred to as a "component," each may also be referred to in the art as a "computing device," "unit", "server", or "system." A component may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 200 is configured to be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must actually be located in a contact center location or controlled by a contact center operator. In addition, depending on the embodiment, the agent positions may be remotely located from the other components of the contact center, sometimes referred to as a "virtual contact center." Those skilled in the art will recognize FIG. 2 represents one possible configuration of a contact center architecture 200, and variations are possible with respect to the protocols, facilities, components, technologies, and equipment used.

Exemplary Computing Entity

Figure 3:
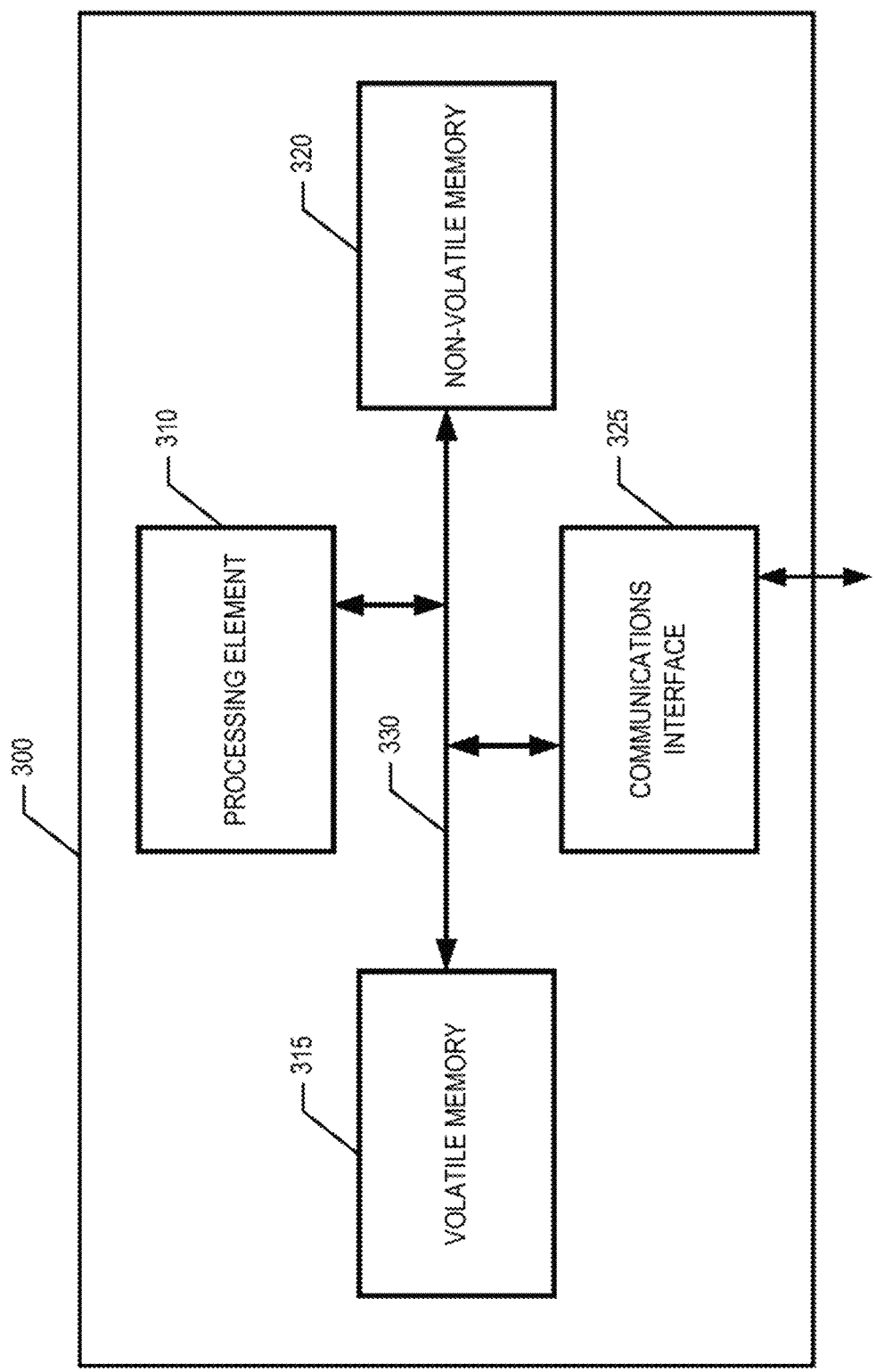
FIG. 3 is a schematic of a computing entity that may be used in conjunction with various embodiments of the present disclosure.

FIG. 3 provides a schematic of a computing entity 300 that may be used in accordance with various embodiments of the present disclosure. For instance, the computing entity 300 may be one or more of the components previously described in FIG. 2. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 300 shown in FIG. 3 may be embodied as a plurality of computing entities, tools, and/or the like operating collectively to perform one or more processes, methods, and/or steps. As just one non-limiting example, the computing entity 300 may comprise a plurality of individual data tools, each of which may perform specified tasks and/or processes.

Depending on the embodiment, the computing entity 300 may include one or more network and/or communications interfaces 325 for communicating with various computing entities, such as by communicating data, content, information, and/or similar terms used herein interchangeably that can be transmitted, received, operated on, processed, displayed, stored, and/or the like. Thus, in certain embodiments, the computing entity 300 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 300 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 300 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 300 includes or is in communication with one or more processing elements 310 (also referred to as processors, processing circuitry, and/or similar terms used herein interchangeably) that communicate with other elements within the computing entity 300 via a bus 330, for example, or network connection. As will be understood, the processing element 310 may be embodied in several different ways. For example, the processing element 310 may be embodied as one or more complex programmable logic devices (CPLDs), microprocessors, multi-core processors, coprocessing entities, application-specific instruction-set processors (ASIPs), and/or controllers. Further, the processing element 310 may be embodied as one or more other processing devices or circuitry. The term circuitry may refer to an entirely hardware embodiment or a combination of hardware and computer program products. Thus, the processing element 310 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 310 may be configured for a particular use or configured to execute instructions stored in volatile or non-volatile media or otherwise accessible to the processing element 310. As such, whether configured by hardware, computer program products, or a combination thereof, the processing element 310 may be capable of performing steps or operations according to embodiments of the present disclosure when configured accordingly.

In various embodiments, the computing entity 300 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 320, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 320 may store files, databases, database instances, database management system entities, images, data, applications, programs, program modules, scripts, source code, object code, byte code, compiled code, interpreted code, machine code, executable instructions, and/or the like. The terms database, database instance, database management system entity, and/or similar terms used herein interchangeably and, in a general sense, to refer to a structured or unstructured collection of information/data that is stored in a computer-readable storage medium.

In particular embodiments, the memory media 320 may also be embodied as a data storage device or devices, as a separate database server or servers, or as a combination of data storage devices and separate database servers. Further, in some embodiments, the memory media 320 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein communicate with various information sources and/or devices in which some or all the information/data required for various embodiments of the disclosure may be stored.

In various embodiments, the computing entity 300 may further include or be in communication with volatile media (also referred to as volatile storage, memory, memory storage, memory circuitry and/or similar terms used herein interchangeably). For instance, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 315 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 310. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 300 with the assistance of the processing element 310 and operating system.

As will be appreciated, one or more of the computing entity's components may be located remotely from other computing entity components, such as in a distributed system. Furthermore, one or more of the components may be aggregated and additional components performing functions described herein may be included in the computing entity 300. Thus, the computing entity 300 can be adapted to accommodate a variety of needs and circumstances.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Agent Group Identification Module

Figure 4:
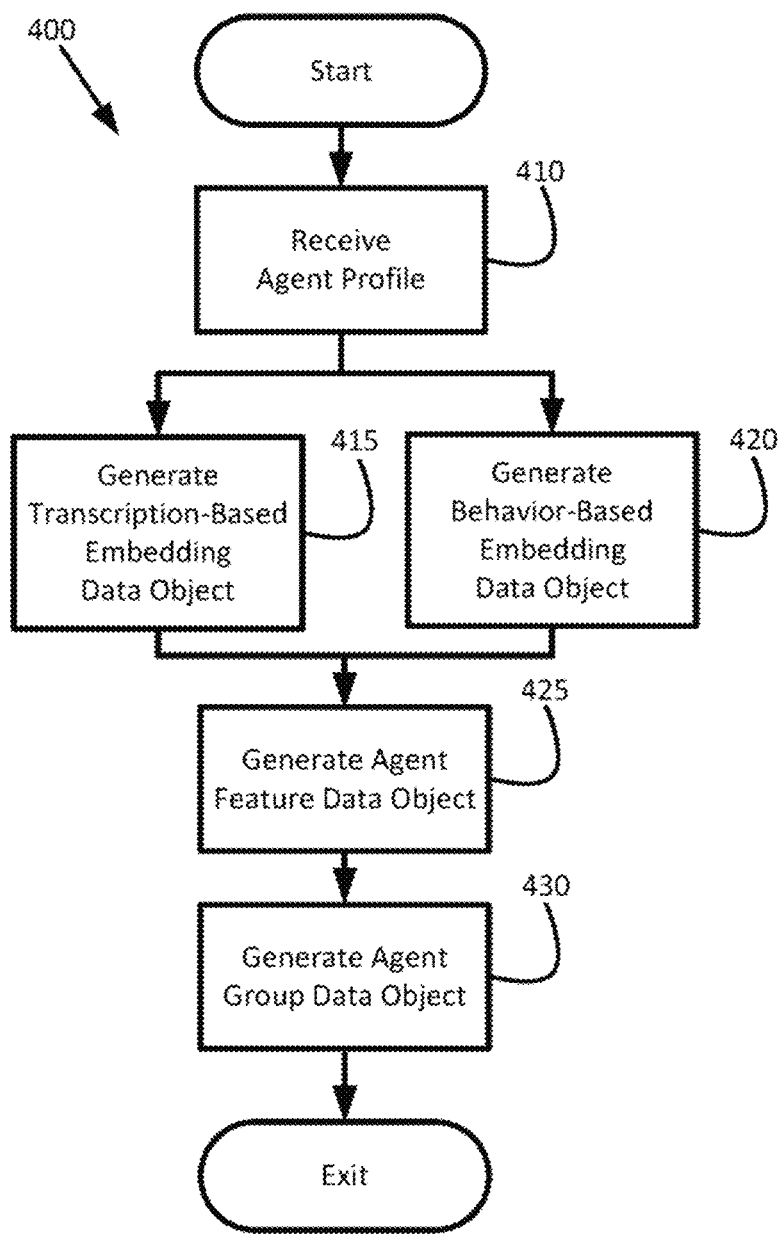
FIG. 4 is a process flow for generating an agent group data object for an agent in accordance with various embodiments of the present disclosure.

Turning now to FIG. 4, additional details are provided regarding a process flow for generating an agent group data object for an agent according to various embodiments. FIG. 4 is a flow diagram showing an agent group identification module for performing such functionality according to various embodiments of the disclosure. For example, the flow diagram shown in FIG. 4 may correspond to operations carried out by a processing element 310 in a computing entity 300, such as the training component 240 or CM 250 described in FIG. 2, as it executes the agent group identification module stored in the computing entity's volatile and/or nonvolatile memory.

Therefore, the process flow 400 begins in various embodiments with the agent group identification module receiving an agent profile in Operation 410. Here, the agent profile is used to identify a particular agent who is to be evaluate on his or her performance with respect to one or more performance metrics. Accordingly, in addition to identifying the agent, the agent profile may serve as a data representation of the agent, providing other features associated with the agent. For example, the agent profile may provide information on the agent such as an employee number, identifier of an area the agent is assigned to work, one or more identifiers of supervisors, and/or the like. In particular embodiments, the agent profile may be used by the agent group identification module in retrieving various data for the agent.

The agent group identification module generates a transcription-based embedding data object for the agent in Operation 415. As previously described, the transcription-based embedding data object may refer to a data object representing one or more features identified from the words spoken by the agent and/or parties who engaged with the agent while handling one or more communications. In particular embodiments, the agent group identification module performs this particular operation by invoking a transcription module to generate the transcription-based embedding data object for the agent. Accordingly, as discussed in further detail herein, the transcription module is configured in various embodiments to process text transcript(s) 111 for the one or more communications in generating the transcription-based embedding data object for the agent.

In addition to the transcription-based embedding data object, the agent group identification module in various embodiments generates a behavioral-based embedding data object for the agent in Operation 420. As previously noted, the technology framework 100 may involve identifying and recording emotions 113 expressed by the agent while handling the one or more communications. These detected emotions may be represented as behavioral data objects. For instance, in particular embodiments, one or more machine learning models may be used in detecting the emotions expressed by the agent while handling the communication(s). For example, where the one or more communications are audio-based, one or more machine learning models may be configured for processing components of the audio of the communication(s) to generate one or more behavioral detection data objects representing emotions expressed by the agent while handling the call(s). Such components may include, for example, pitch, tone, speed, power of voice, and/or the like. In another example, where the one or more communications are text-based, one or more rule-based models may be configured for generating one or more behavioral detection data objects representing emotions expressed in the text based at least in part on grammatical and logical rules. For instance, such rule-based models may encompass keyword recognition and use of emotion dictionaries or lexicons.

In some embodiments, the agent group identification module may be configured to gather other behavioral attributes demonstrated by the agent while handling the one or more communications. These behavioral attributes may also be represented as behavioral detection data objects. For example, the agent group identification module may be configured to gather behavioral attributes such as percentage of communications in which the agent was conversing, average speaking rate on communications involving voice, periods of non-conversing (e.g., silence), number of times an empathy cue appeared, number of times an energy cue appeared, and/or the like.

Accordingly, in various embodiments, the agent group identification module processes the behavioral detection data objects using a behavioral processing machine learning model to generate the behavioral-based embedding data object for the agent. For example, in particular embodiments, the behavioral processing machine learning model may be configured as a deep learning model such as one or more conventional RNNs, GRUs, LSTMs, and/or the like. In some embodiments, the behavioral-based embedding data object may be configured as a vector of feature values representing behavioral attributes demonstrated by the agent while handling the communication(s). Therefore, the behavioral-based embedding data object may serve in a functional role representing the relevant behavioral features demonstrated by the agent while handling the communication(s).

In some embodiments, the behavioral detection data objects are provided as inputs to the behavioral processing machine learning model. The behavioral processing machine learning model is configured to process the behavioral detection data objects to generate, as an output of the behavioral processing machine learning model, the behavioral-based embedding data object for the agent. Each behavioral detection data object may be a vector that describes, as each vector value, one or more behavioral detection features. The behavioral-based embedding data object may be a vector that describes, as each vector value, one or more behavioral-based embedding features that are determined based on processing the behavioral detection data objects.

At this point, in various embodiments, the agent group identification module generates an agent feature data object for the agent using the transcription-based embedding data object and the behavioral-based embedding data object in Operation 425, Here, in particular embodiments, the agent group identification module may make use of an agent feature merger machine learning model configured to combine the transcription-based embedding data object and the behavioral-based embedding data object into the agent feature data object via a process such as concatenation, integration, merger, hashing, and/or the like. For example, the agent feature merger machine learning model may be configured to combine the feature values found in the transcription-based embedding data object and the behavioral-based embedding data object into a combined vector representing the agent feature data object. Accordingly, the agent feature data object may be a vector of feature values representing different semantic and/or behavioral features expressed and/or demonstrated by the agent while handling the communication(s).

Finally, in various embodiments, the agent group identification module generates an agent group data object for agent in Operation 430. The agent group data object represents a group of agents having similar features as the agent with respect to fielding one or more types of communications. Accordingly, in particular embodiments, the agent group identification module uses an agent group identifier machine learning model to generate the agent group data object for the agent. Here, the agent group identifier machine learning model may be a machine learning model such as a clustering model or classification model. For example, the agent group identifier machine learning model may be a KNN clustering model, a k-means clustering model, mean shift clustering model, and/or the like. Therefore, the agent group identifier machine learning model may be configured to process the agent feature data object to identify an agent group cluster/classification for the agent. As discussed further herein, the agent group data object may be used in various embodiments to identify a top performer data object that may be used in evaluating the agents performance for the one or more communications, as well as identify a party profile associated with a party that may be used in designing and/or conducting personalized training for the agent to address performance gaps (e.g., deficiencies) identified for the agent.

In some embodiments, the agent feature data objects are provided as inputs to the agent group identifier machine learning model. The agent group identifier machine learning model is configured to process the agent feature data object to generate, as an output of the agent group identifier machine learning model, the agent group data object for the agent. Each agent feature data object may be a vector that describes, as each vector value, one or more agent features. The agent group data object may be an atomic value that describes the agent grouping for a corresponding agent feature data object.

Transcription Module

Figure 5:
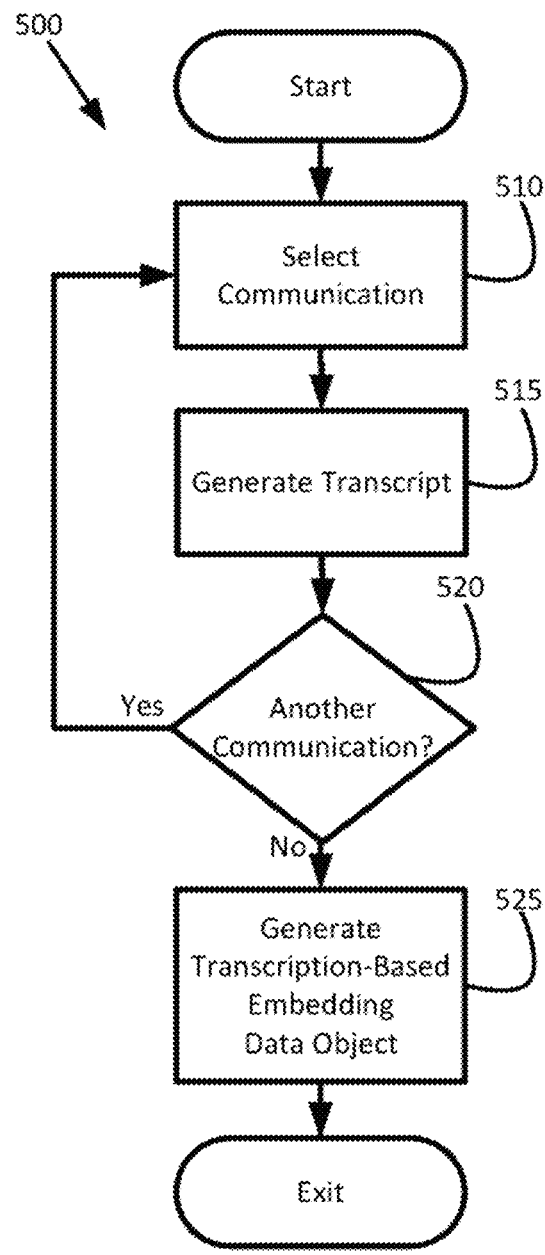
FIG. 5 is a process flow for generating a transcription-based embedding data object in accordance with various embodiments of the present disclosure.

Turning now to FIG. 5, additional details are provided regarding a process flow for generating a transcription-based embedding data object for an agent or party according to various embodiments. FIG. 5 is a flow diagram showing a transcription module for performing such functionality according to various embodiments of the disclosure. For example, the flow diagram shown in FIG. 5 may correspond to operations carried out by a processing element 310 in a computing entity 300, such as the training component 240 or CM 250 described in FIG. 2, as it executes the transcription module stored in the computing entity's volatile and/or nonvolatile memory. As previously mentioned, the transcription module may be invoked by the agent group identification module in particular embodiments to generate a transcription-based embedding data object for an agent. However, in some embodiments, the transcription module may be invoked by a different module, or as a stand-alone module in other instances.

The process flow 500 begins in various embodiments with the transcription module selecting a communication in Operation 510. Accordingly, the communication may involve an agent of interest or a party of interest and the communication may be represented by a communication data object. Here, in particular embodiments, the communication may be one of a plurality of communications used in generating the transcription-based embedded data object for the agent or party. For example, the transcription module may have been invoked to generate a transcription-based embedding data object for agent whose performance is being evaluated for the plurality of communications. Therefore, the transcription module may have been invoked and provided with one or more communication data objects representing the plurality of communications.

The transcription module then generates a text transcript 111 for the communication in Operation 515. For example, the communication may be an audio-based communication such as a voice call in which the agent or party was involved. Here, the transcription module may be configured to retrieve the audio 110 (e.g., audio recording/file) for the communication, and generate a text transcript 111 from the audio using some type of automatic speech recognition technology. In another example, the communication may be a text-based communication such as a Web chat and/or text message exchange. Therefore, the transcription module may be configured to retrieve the text transcript 111 already generated for the communication or generate the text transcript 111 from a data source having the complete textual exchange of the agent and the party recorded for the communication.

The transcription module then determines whether a text transcript 111 needs to be generated for another communication in Operation 520. If so, then the transcription module returns to Operation 510, selects the next communication, and generates a text transcript 111 for the newly selected communication as just described.

Once the text transcript(s) 111 have been generated for all the communication(s), the transcription module in various embodiments processes the text transcript(s) 111 using a transcription processing machine learning model to generate the transcription-based embedding data object in Operation 525. Accordingly, in particular embodiments, the transcription processing machine learning model may be configured for performing natural language processing on the text transcript(s) 111 to generate the transcription-based embedding data object. For example, the transcription processing machine learning model may be configured as a deep learning model such as a BERT model. Here, the transcription-based embedding data object may be configured as a vector of feature values representing various features identified from the words spoken by the agent while engaged in the communication(s). Therefore, in various embodiments, the transcription-based embedding data object may serve in a functional role in representing the relevant semantic features expressed in spoken words while the agent or party was engaged in the one or more communications.

Performance Metric Recommendation Module

Figure 6:
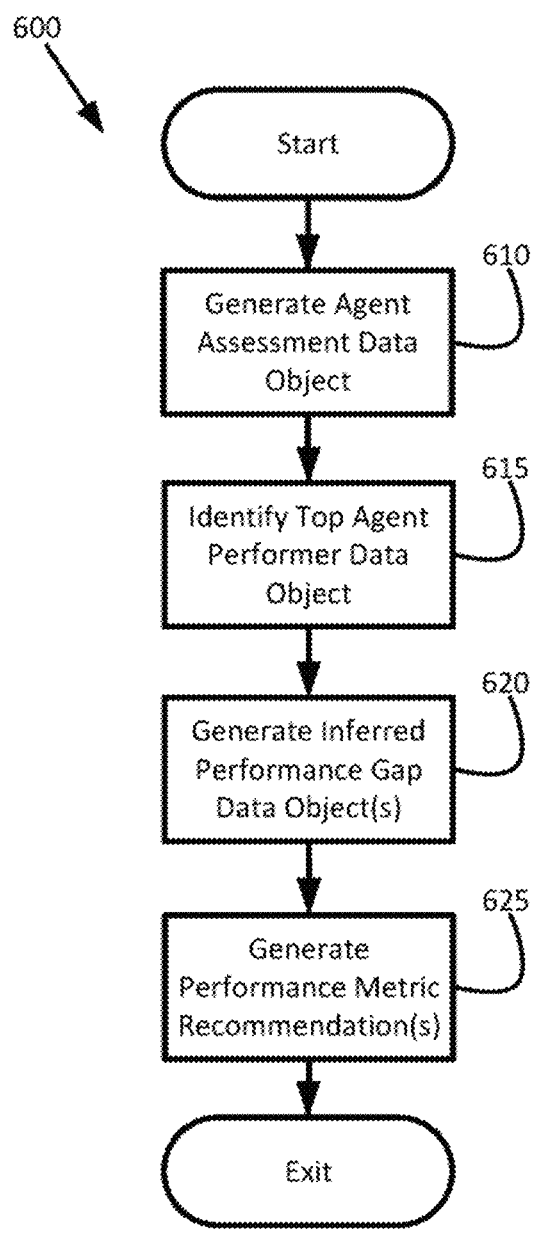
FIG. 6 is a process flow for generating one or more performance metric recommendations for an agent in accordance with various embodiments of the present disclosure.

Turning now to FIG. 6, additional details are provided regarding a process flow for generating one or more performance metric recommendations for an agent according to various embodiments. In particular embodiments, a performance metric recommendation may be an inferred recommendation for training an agent based at least in part on a gap in performance identified for the agent with respect to a top performing agent. FIG. 6 is a flow diagram showing a performance metric recommendation module for performing such functionality according to various embodiments of the disclosure. For example, the flow diagram shown in FIG. 6 may correspond to operations carried out by a processing element 310 in a computing entity 300, such as the training component 240 or CM 250 described in FIG. 2, as it executes the performance metric recommendation module stored in the computing entity's volatile and/or nonvolatile memory.

The process flow 600 begins in various embodiments with the performance metric recommendation module generating an agent assessment data object 115 for the agent in Operation 610. As previously mentioned, in some embodiments, one or more performance evaluations 112 may be generated for the agent. For example, quality assurance personnel working for the contact center may have reviewed one or more communication(s) that the agent handled for the contact center and provided one or more evaluations on the agent's performance in handling the communication(s). In addition, parties who were engaged with the agent on the one or more communications may provide evaluations through the use of, for example, a survey. Therefore, in particular embodiments, the performance metric recommendation module may be configured to generate the agent assessment data object 115 for the agent from such evaluation(s).

For example, the evaluation(s) may be provided by quality assurance personnel in the form of one or more scorecards that are filled out by the personnel as he or she reviews the one or more communications for the agent. Accordingly, a scorecard may provide measurements (e.g., scores) for one or more performance metrics as determined by the personnel as he or she reviews the communication(s). The same may be true of a survey filled out by a party who engaged with the agent on a communication. Therefore, the performance metric recommendation module may be configured in particular embodiments to generate the agent assessment data object 115 based at least in part on the measurements provided in the evaluation(s). In some embodiments, the evaluation(s), themselves, may serve as the agent assessment data object 115. Depending on the embodiment, the agent assessment data object 115 may provide data on specific performance metrics and/or may provide more generalized data on the agent's performance. For example, in particular embodiments, an agent assessment data object 115 may be configured as a vector of feature values in which each feature value represents an inferred measurement of a specific performance metric for the agent.

Next, the performance metric recommendation module identifies a top performer data object for the agent in Operation 615. As previously discussed, a top performing agent may represent an agent who can ideally perform at a high level (e.g., top five percent) for various target performance metrics involved in handling communications for the contact center. A target performance metric may be a performance metric the contact center is interested in having the agent perform at an acceptable level to handle communications for the contact center. For example, the contact center may be interested in having agents handle communications in a certain amount of time, on average (e.g., perform at an acceptable average handle time). Therefore, in various embodiments, the top agent performer data object 114 represents the various target performance metrics that a top performing agent should possess. Accordingly, in particular embodiments, the performance metric recommendation module identities the applicable top agent performer data object 114 for the agent based the agent group data object identified for the agent profile associated with the agent.

At this point, in various embodiments, the performance metric recommendation module compares the agent assessment data object 115 representing the agent's performance with the identified top agent performer data object 114 to generate one or more inferred performance gap data objects for the agent in Operation 620. In particular embodiments, the performance metric recommendation module performs this operation by processing the agent assessment data object 115 and top agent performer data object 114 using a comparison machine learning model to generate the one or more inferred performance gap data objects for the agent. In some embodiments, the comparison machine learning model may be a machine learning model such as a support vector machine, decision tree, neural network, and/or the like. In other embodiments, the comparison machine learning model may be a rule-based model configured for applying rule-based logic in generating the one or more inferred performance gap data objects. For example, the rule-based logic may be configured for identifying gaps in performance based at least in part on measured differences in performance satisfying threshold values. Accordingly, the one or more inferred performance gap data objects may represent gaps (e.g., deficiencies) in the agent's performance with respect to the top performing agent as represented by the top agent performer data object 114. For example, an inferred performance gap data object may represent a measurement (e.g., value) of a performance gap for the agent with respect to a particular performance metric.

In some embodiments, the comparison machine learning model may be configured to receive the agent assessment data object and top agent performer data object as inputs and generate the inferred performance gap data objects as outputs. The agent assessment data object may be a vector of one or more agent assessment values with respect to one or more agent assessment features/metrics. The top agent performer data object may be a vector of one or more top performer agent assessment values with respect to one or more agent assessment features/metrics. The inferred performance gap data object may be a vector of one or more inferred performance gap measures with respect to one or more agent assessment features/metrics.

At this point, in particular embodiments, the performance metric recommendation module may generate one or more performance metric recommendations to address the identified inferred performance gap data object(s) in Operation 625. For example, in some embodiments, the performance metric recommendation module may be configured to query some type of data source identifying various performance metric recommendations to address inferred performance gaps identified for different performance metrics. Here, the data source may identify various performance metric recommendations for a particular performance metric based at least in part on the level (e.g., measurement) of performance gap demonstrated by the agent for the performance metric.

For example, the performance metric may an average amount of time an agent uses wrapping up a communication after the communication has completed before handling another communication. This is often refer to as average after communication work time. For a first agent, an inferred performance gap data object may identify a measurement in performance gap of three minutes for the agent. For a second agent, an inferred performance gap data object may identify a measurement in performance gap of seven minutes for the agent. Therefore, in this example, a first performance metric recommendation may be defined to address an inferred performance gap data object representing a performance gap in average after communication work time of less than four minutes and a second performance metric recommendation may be defined to address an inferred performance gap data object representing a performance gap in average after communication work time of between five and eight minutes. Therefore, the performance metric recommendation module may generate the first performance metric recommendation for the first agent and the second performance metric recommendation for the second agent to address the inferred performance gaps data objects representing average after communication work time generated for the two agents. The two different performance metric recommendations to address an agents' performance gaps with respect to average after communication work time may be used in designing and/or conducting different training to address the performance gaps. Accordingly, such a configuration may allow for more personalized training to be designed and conducted for an agent to address a performance gap for a particular performance metric based at least in part on the level of deficiency the agent exhibits for the performance metric.

Talking Point Module

Figure 7:
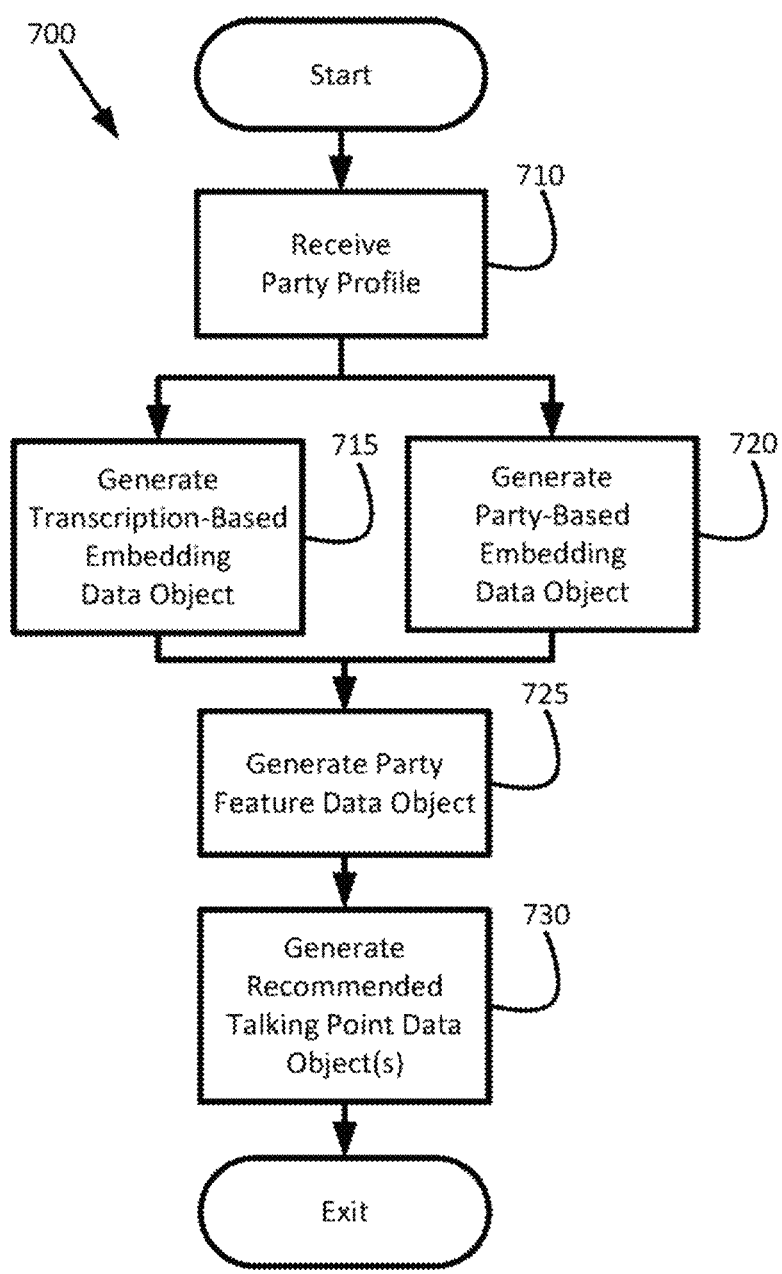
FIG. 7 is a process flow for generating one or more talking point data objects in accordance with various embodiments of the present disclosure.

Turning now to FIG. 7, additional details are provided regarding a process flow for generating one or more recommended talking point data objects 125 for a party according to various embodiments. FIG. 7 is a flow diagram showing a talking point module for performing such functionality according to various embodiments of the disclosure. For example, the flow diagram shown in FIG. 7 may correspond to operations carried out by a processing element 310 in a computing entity 300, such as the training component 240 or CM 250 described in FIG. 2, as it executes the talking point module stored in the computing entity's volatile and/or nonvolatile memory.

As previously discussed, a talking point data object may represent a recommended talking point identified as suitable for delivering to a particular party who has and/or will engaged in one or more types of communications with agents. For example, a recommended talking point may involve a particular topic that may be of interest to the party in discussing while engaged in a communication with an agent. In another example, a recommended talking point may be a particular information that should be conveyed by an agent to the party while engaged in a communication. As previously noted, the recommended talking point data objects may be used in various embodiments in designing and conducting personalized training for a particular agent so that the recommended talking points represented by the one or more recommended talking point data objects can be used in the personalized training conducted with the agent. For example, the training may involve conducting a simulation of a communication between the agent and the party (e.g., virtual representation of the party), in which the recommended talking point data objects may be used in identifying various talking points that are to be incorporated into the simulation.

The process flow 700 begins in various embodiments with the talking point module receiving a party profile for the party in Operation 710. Similar to the agent profile, the party profile is used to identify a particular party for who one or more talking points are being identified. Accordingly, in addition to identifying the party, the party profile may serve as a data representation of the party, providing other features associated with the party. For example, the party profile may provide information on the party such as party/member identifier, group identifier, product/service associations, and/ or the like. In particular embodiments, the party profile may be used by the talking point module in retrieving various data for the party.

The talking point module generates a transcription-based embedding data object for the party in Operation 715. Accordingly, this operation may involve the talking point module generating text transcripts of the words spoken by the party and/or agents who engaged with the party on one or more communications for the communication data object(s) representing the communication(s) in a similar fashion as used to generate the text transcripts 111 for an agent. Therefore, in particular embodiments, the talking point module may be configured to invoke the transcription module, as previously discussed, to generate the transcription-based embedding data object for the party.

Further, in various embodiments, the talking point module generates a party-based embedding data object for the party in Operation 720. Accordingly, the party-based embedding data object may represent data gathered on the party that is not necessarily drawn directly from the communications(s). For instance, in particular embodiments, the talking point module may gather data from sources that may be used to store information associated with the party that is not extracted from the communication(s). For example, the contact center may be associated with a health insurance provider. This health insurance provider may collect and store information 120 on various policy holders such as, for example, medical claims submitted by the policy holders, lab results from medical tests conducted for the policy holders, pharmacy information, lifestyle and fitness choices, and/or the like. Such information may be helpful in identifying talking points of interest from the party. In addition, other information such as demographic information on age, income level, gender, residency, and/or the like may be gathered.

Accordingly, the gathered data may be represented by one or more party feature data objects. Therefore, in particular embodiments, the talking point module is configured to process the party feature data object(s) using a party feature processing machine learning model to generate the party-based embedding data object. For instance, the party feature processing machine learning model may be a deep learning model such as, for example, one or more RNNs, GRUs, LSTMs, and/or the like. In some embodiments, the party feature processing machine learning model may generate the party-based embedding data object as a vector of feature values representing various characteristic features for the party identified from the various data gathered on the party. In some embodiments, a party feature data object is provided as an input to the party feature processing machine learning model and includes a vector of one or more party feature values, while the party-based embedding data object is an output of the party feature processing machine learning model and includes a vector of one or more party embedded feature values.

At this point, in various embodiments, the talking point module generates a party feature data object based at least in part on the transcription-based embedding data object and the party-based embedding data object in Operation 725. Accordingly, in particular embodiments, the talking point module may perform this operation by processing the transcription-based embedding data object and the party-based embedding data object using a party feature merger machine learning model to generate the party feature data object. Similar to the agent feature merger machine learning model, the party feature merger machine learning model may be configured to combine the transcription-based embedding data object and the party-based embedding data object into the party feature data object via a process such as concatenation, integration, merger, hashing, and/or the like. For example, the party feature merger machine learning model may be configured to combine the feature values found in the transcription-based embedding data object and the party-based embedding data object into a combined vector representing the party feature data object. Accordingly, in some embodiments, the party feature data object may be a vector of feature values representing different characteristic features of the party.

Once the talking point module has generated the party feature data object, the talking point module uses the party feature data object to generate one or more recommended talking point data objects 125 for the party profile associated with the party in Operation 730. Accordingly, in various embodiments, the talking point module performs this operation by processing the party feature data object using a recommended talking point identifier machine learning model to generate the recommended talking point data object(s) 125 for the party profile. In particular embodiments, the recommended talking point identifier machine learning model may be a machine learning model such as a support vector machine, decision tree, neural network, and/or the like. For example, in some embodiments, the recommended talking point identifier machine learning model may be a multi-case classifier model configured for generating the recommended talking point data object(s) 125 based at least in part on labeling a set of recommended talking points and identifying those labeled recommended talking points satisfying a threshold probability value. As previously noted, the generated recommended talking point data objects 125 may be used in various embodiments in designing and/or conducting personalized training for an agent such simulation training for the agent. Accordingly, the simulation training may involve simulating a communication between the agent and the party (e.g., a virtual representation of the party) associated with the recommended talking point data objects 125 in which the talking points represented by the recommended talking point data objects 125 are incorporated into the simulation. In some embodiments, a party feature data object is provided as an input to the recommended talking point identifier machine learning model and includes a vector of one or more party feature values, while the recommended talking point data object is an output of the recommended talking point identifier machine learning model and includes a vector of one or more talking point recommendations scores for a group of candidate talking point recommendations.

Training Module

Figure 8:
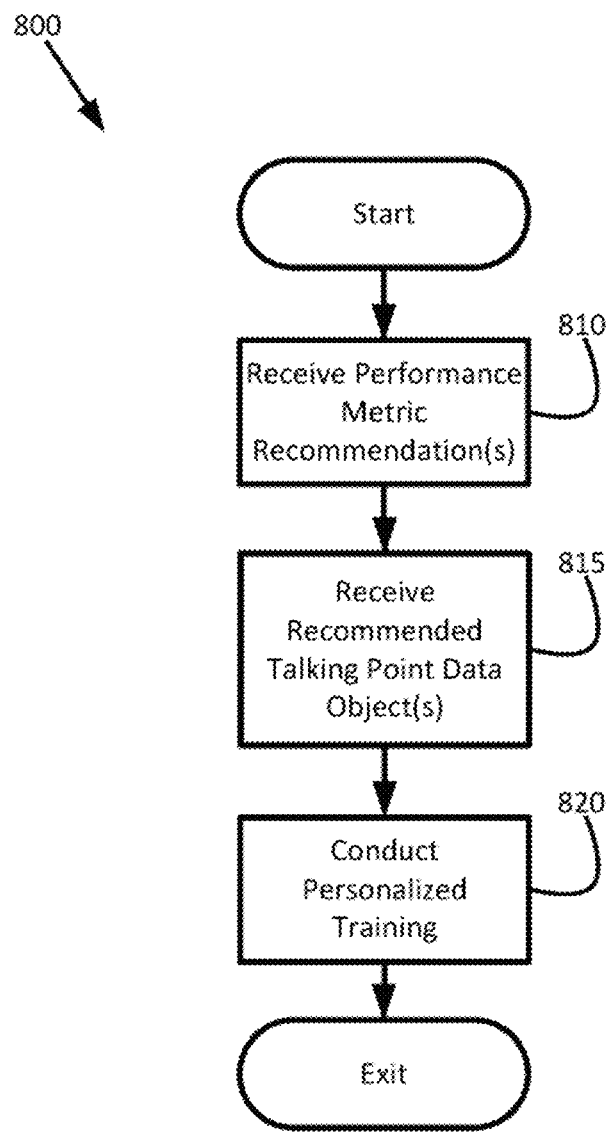
FIG. 8 is a process flow for conducting personalized training for an agent in accordance with various embodiments of the present disclosure.

Turning now to FIG. 8, additional details are provided regarding a process flow for conducting personalized training for an agent based at least in part on one or more performance metric recommendations and one or more recommended talking point data objects 125 according to various embodiments. FIG. 8 is a flow diagram showing a training module for performing such functionality according to various embodiments of the disclosure. For example, the flow diagram shown in FIG. 8 may correspond to operations carried out by a processing element 310 in a computing entity 300, such as the training component 240 or CM 250 described in FIG. 2, as it executes the training module stored in the computing entity's volatile and/or nonvolatile memory.

The process flow 800 begins in various embodiments with the training module receiving one or more performance metric recommendations for the agent in Operation 810.

Accordingly, in particular embodiments, the performance metric recommendations may identify various aspects (e.g., components) for conducting the training to specifically tailor the training to help the agent address the inferred performance gap data objects associated with the performance metric recommendations. For example, a performance metric recommendation may indicate that the agent should improve on his or her greeting delivery when answering voice calls for the contact center. Therefore, the training may be designed based at least in part on this performance metric recommendation to involve the agent providing various versions of a voice call greeting to help the agent in improving his or her performance in delivering such greetings.

In addition, the training module receives one or more talking point data objects to be used in conducting the training in Operation 815. As previously noted, the talking point data object(s) 125 may represent various talking points that may delivered and/or discussed by the agent during the training. In many instances, these talking points may be based at least in part on a particular party (e.g., associated with a particular party profile representing the party) and the personalized training may involve simulating a communication between the agent and the party (e.g., a virtual representation of the party). Accordingly, the recommended talking point data objects 125 may be used in guiding the flow of the simulation by incorporating the talking points represented by the talking point data object(s) 125 into the communication. Finally, the training module conducts the personalized training for the agent as designed based at least in part on the one or more performance metric recommendations and one or more recommended talking point data objects 125 in Operation 820.

As previously discussed, in particular embodiments, the personalized training may involve personalized simulation training, and the personalized simulation training may be characterized by a simulation communication data object representing a simulated communication taking place between the agent and the party represented by a party profile. Here, in particular embodiments, the simulation may be conducted using virtual technology to represent the party. Accordingly, in some embodiments, the virtual technology may be configured to generate a virtual version of the party (virtual party) based at least in part on one or more features represented by the party profile and/or the party feature data object generated for the party profile. In addition, the simulation may be designed in various embodiments to incorporate features tailored to address the performance metric recommendations identified for the agent, as well as incorporate the recommended talking points identified by the recommended talking point data object(s) 125. Thus, the simulation training can be viewed as personalized for the agent in the sense that the training is designed and/or conducted specifically to address the one or more inferred performance gap data objects identified for the agent.

In some embodiments, the training module may be configured to provide personalized improvement 130 to the agent through the use of a subject specialized module 135 and a role play module 140. The subject specialized module 135 may be configured to identify simulation components for conducting the simulation based at least in part on the recommended talking point data object(s) 125. While the role play module 140 may be configured to identify the simulation components for conducting the simulation based at least in part on the one or more performance metric recommendations identified for the agent and conduct the simulation based at least in part on the simulation components for both the recommended talking point data object(s) 125 and performance metric recommendations accordingly. In addition, the training module may be configured in some embodiments to provide the agent with a score ranking/tracking 145 with respect to the agent's progress on addressing the performance gaps identified in the inferred performance gap data objects. As a result, the training module can serve as a feedback loop 150 in facilitating the agent's improvement in performance.

Further, although not shown in FIG. 8, the training module may be configured in particular embodiments to identify the party (e.g., the party profile) to use in the personalized training based at least in part on the agent group data object identified for the agent profile associated with the agent. Accordingly, in these particular embodiments, the training module may be configured to identify the recommended talking point data objects 125 associated with the party profile representing the party that are then used in the personalized training for the agent.

CONCLUSION

Many modifications and other embodiments of the disclosure set forth herein will come to mind to one skilled in the art to which these modifications and other embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors and using an agent group identifier machine learning model, an agent group data object for an agent profile of an agent based at least in part on an agent feature data object, wherein the agent feature data object is generated based at least in part on a plurality of communication data objects each representing a communication associated with the agent profile;
generating, by the one or more processors, an agent assessment data object for the agent profile, wherein the agent assessment data object represents a performance evaluation for the agent in relation to at least one communication;
generating, by the one or more processors and using a comparison machine learning model, an inferred performance gap data object based at least in part on (a) the agent assessment data object and (b) a top agent performer data object identified based at least in part on the agent group data object;
generating, by the one or more processors, a one or more performance metric recommendation based at least in part on the one or more inferred performance gap data object; and
initiating, by the one or more processors, the performance of one or more performance-related actions based at least in part on the performance metric recommendation.

2. The computer-implemented method of claim 1, wherein generating the agent feature data object for the agent profile comprises:

generating a text transcript from a communication data object of the plurality of communication data objects; and generating, using a transcription processing machine learning model, a transcription-based embedding data object for the agent feature data object based at least in part on the text transcript.

3. The computer-implemented method of claim 2, wherein the transcription processing machine learning model comprises bidirectional encoder representations from a transformer-based natural language processing machine learning model.

4. The computer-implemented method of claim 2, wherein generating the agent feature data object for the agent profile further comprises:

generating, using a behavioral processing machine learning model, a behavioral-based embedding data object based at least in part on one or more behavioral detection data objects for the agent profile, wherein the one or more behavioral detection data objects identify behavioral attributes recorded in relation to an observed behavior of the agent represented by the agent profile during the at least one communication; and generating, using an agent feature merger machine learning model, the agent feature data object based at least in part on the transcription-based embedding data object and the behavioral-based embedding data object.

5. The computer-implemented method of claim 1 further comprising:

generating a party feature data object for a party profile representing a party; and generating, using a talking point identifier machine learning model, a plurality of recommended talking point data objects for the party profile based at least in part on the party feature data object.

6. The computer-implemented method of claim 5, wherein the one or more performance-related actions comprise causing presentation of a personalized simulation training characterized by a simulated communication data object between the agent represented by the agent profile and the party represented by the party profile, and wherein the simulated communication data object is determined based at least in part on the plurality of recommended talking point data objects.

7. The computer-implemented method of claim 5, wherein generating the party feature data object for the party comprises:

generating a text transcript from a communication data object of the plurality of communication data objects associated with the party profile; and generating, using a transcription processing machine learning model, a transcription-based embedding data object of the party feature data object based at least in part on the text transcripts.

8. The computer-implemented method of claim 7, wherein generating the party feature data object for the party further comprises:

generating, using a party feature processing machine learning model, a party-based embedding data object based at least in part on one or more party feature data objects associated with the party profile; and generating, using a party feature merger machine learning model, the party feature data object based at least in part on the transcription-based embedding data object for the party profile and the party-based embedding data object.

9. An apparatus comprising one or more processors and memory including program code, the memory and the program code configured to, with the one or more processors, cause the apparatus to at least:

generate, using an agent group identifier machine learning model, an agent group data object for an agent profile of an agent based at least in part on an agent feature data object, wherein the agent feature data object is generated based at least in part on a plurality of communication data objects each representing a communication associated with the agent profile;

generate an agent assessment data object for the agent profile, wherein the agent assessment data object represents a performance evaluation for the agent in relation to at least one of communication;

generate, using a comparison machine learning model, an inferred performance gap data object based at least in part on (a) the agent assessment data object and (b) a top agent performer data object identified based at least in part on the agent group data object;

generate a performance metric recommendation based at least in part on the inferred performance gap data object; and initiate the performance of one or more performance-related actions based at least in part on the performance metric recommendation.

10. The apparatus of claim 9, wherein the memory and the program code are configured to, with the one or more processors, cause the apparatus to generate the agent feature data object for the agent profile by:

generating a text transcript from a communication data object of the plurality of communication data objects; and generating, using a transcription processing machine learning model, a transcription-based embedding data object for the agent feature data object based at least in part on the text transcript.

11. The apparatus of claim 10, wherein the and the program code are configured to, with the one or more processors, cause the apparatus to generate the agent feature data object for the agent profile by:

generating, using a behavioral processing machine learning model, a behavioral-based embedding data object based at least in part on one or more behavioral detection data objects for the agent profile, wherein the one or more behavioral detection data objects identify behavioral attributes recorded in relation to an observed behavior of the agent represented by the agent profile during the at least one communication; and generating, using an agent feature merger machine learning model, the agent feature data object based at least in part on the transcription-based embedding data object and the behavioral-based embedding data object.

12. The apparatus of claim 9, wherein the memory and the program code are configured to, with the one or more processors, cause the apparatus to:

generate a party feature data object for a party profile representing a party; and generate, using a talking point identifier machine learning model, a plurality of recommended talking point data objects for the party profile based at least in part on the party feature data object.

13. The apparatus of claim 12, wherein the one or more performance-related actions comprise causing presentation of a personalized simulation training characterized by a simulated communication data object between the agent represented by the agent profile and the party represented by the party profile, and wherein the simulated communication data object is determined based at least in part on the plurality of recommended talking point data objects.

14. The apparatus of claim 12, wherein the memory and the program code are configured to, with the one or more processors, cause the apparatus to generate the party feature data object for the party by:
generating a text transcript from a communication data object of the plurality of communication data objects associated with the party profile; and
generating, using a transcription processing machine learning model, a transcription-based embedding data object of the party feature data object based at least in part on the text transcripts.

15. The apparatus of claim 14, wherein the memory and the program code are configured to, with the one or more processors, cause the apparatus to generate the party feature data object for the party by:
generating, using a party feature processing machine learning model, a party-based embedding data object based at least in part on one or more party feature data objects associated with the party profile; and
generating, using a party feature merger machine learning model, the party feature data object based at least in part on the transcription-based embedding data object for the party profile and the party-based embedding data object.

16. A non-transitory computer storage medium comprising instructions configured to cause one or more processors to:
generate, using an agent group identifier machine learning model, an agent group data object for an agent profile of an agent based at least in part on an agent feature data object, wherein the agent feature data object is generated based at least in part on a plurality of communication data objects each representing a communication associated with the agent profile;
generate an agent assessment data object for the agent profile, wherein the agent assessment data object represents a performance evaluation for the agent in relation to at least one communication;
generate, using a comparison machine learning model, an inferred performance gap data object based at least in part on (a) the agent assessment data object and (b) a top agent performer data object identified based at least in part on the agent group data object;
generate a performance metric recommendation based at least in part on the inferred performance gap data object; and
initiate the performance of one or more performance-related actions based at least in part on the performance metric recommendation.

17. The non-transitory computer storage medium of claim 16, wherein the instructions are configured to cause the one or more processors to generate the agent feature data object for the agent profile by:
generating a text transcript from a communication data object of the plurality of communication data objects; and
generating, using a transcription processing machine learning model, a transcription-based embedding data object for the agent feature data object based at least in part on the text transcript.

18. The non-transitory computer storage medium of claim 17, wherein the instructions are configured to cause the one or more processors to generate the agent feature data object for the agent profile by:
generating, using a behavioral processing machine learning model, a behavioral-based embedding data object based at least in part on one or more behavioral detection data objects for the agent profile, wherein the one or more behavioral detection data objects identify behavioral attributes recorded in relation to an observed behavior of the agent represented by the agent profile during the at least one communication; and
generating, using an agent feature merger machine learning model, the agent feature data object based at least in part on the transcription-based embedding data object and the behavioral-based embedding data object.

19. The non-transitory computer storage medium of claim 16, wherein the instructions are configured to cause the one or more processors to:
generate a party feature data object for a party profile representing a party; and
generate, using a talking point identifier machine learning model, a plurality of recommended talking point data objects for the party profile based at least in part on the party feature data object.

20. The non-transitory computer storage medium of claim 19, wherein the one or more performance-related actions comprise causing presentation of a personalized simulation training characterized by a simulated communication data object between the agent represented by the agent profile and the party represented by the party profile, and wherein the simulated communication data object is determined based at least in part on the plurality of recommended talking point data objects.

* * * * *

UNITED STATES PATENT AND TRADEMARK OFFICE
CERTIFICATE OF CORRECTION

PATENT NO. : 11,758,048 B2
APPLICATION NO. : 17/658673
DATED : September 12, 2023
INVENTOR(S) : Jun Li et al.

It is certified that error appears in the above-identified patent and that said Letters Patent is hereby corrected as shown below:

In the Claims

In Column 38, Line 57, Claim 1, delete "a one or more" and insert -- a --, therefor.

In Column 38, Line 59, Claim 1, delete "the one or more" and insert -- the --, therefor.

In Column 39, Line 55, Claim 7, delete "transcripts." and insert -- transcript. --, therefor.

In Column 40, Line 15, Claim 9, delete "one of" and insert -- one --, therefor.

In Column 40, Line 38, Claim 11, delete "the and" and insert -- the memory and --, therefor.

Signed and Sealed this
Twenty-eighth Day of November, 2023

Katherine Kelly Vidal
*Director of the United States Patent and Trademark Office*